US011640314B2

(12) United States Patent
Iwasa et al.

(10) Patent No.: US 11,640,314 B2
(45) Date of Patent: May 2, 2023

(54) SERVICE PROVISION SYSTEM, RESOURCE ALLOCATION METHOD, AND RESOURCE ALLOCATION PROGRAM

(71) Applicant: Nippon Telegraph and Telephone Corporation, Tokyo (JP)

(72) Inventors: Eriko Iwasa, Musashino (JP); Makoto Hamada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 271 days.

(21) Appl. No.: 16/970,591

(22) PCT Filed: Feb. 14, 2019

(86) PCT No.: PCT/JP2019/005325
§ 371 (c)(1),
(2) Date: Aug. 17, 2020

(87) PCT Pub. No.: WO2019/160030
PCT Pub. Date: Aug. 22, 2019

(65) Prior Publication Data
US 2021/0117219 A1    Apr. 22, 2021

(30) Foreign Application Priority Data

Feb. 19, 2018 (JP) .............................. JP2018-026723

(51) Int. Cl.
*G06F 9/455* (2018.01)
*G06F 9/50* (2006.01)
*G06F 11/20* (2006.01)

(52) U.S. Cl.
CPC ........ *G06F 9/45558* (2013.01); *G06F 9/5027* (2013.01); *G06F 11/2023* (2013.01);
(Continued)

(58) Field of Classification Search
CPC .............. G06F 9/45558; G06F 9/5027; G06F 11/2023; G06F 2009/45575; G06F 2201/815
(Continued)

(56) References Cited

U.S. PATENT DOCUMENTS

2007/0282939 A1   12/2007  Ohno et al.
2009/0094481 A1    4/2009  Vera et al.
(Continued)

FOREIGN PATENT DOCUMENTS

JP       2006-146420        6/2006
JP       2009-524863        7/2009
(Continued)

OTHER PUBLICATIONS

[No Author Listed], "Service Availability™ Forum Application Interface Specification," Service Availability Forum, Sep. 30. 2011, 452 pages.
(Continued)

*Primary Examiner* — Yair Leibovich
(74) *Attorney, Agent, or Firm* — Fish & Richardson P.C.

(57) ABSTRACT

The utilization efficiency of physical resources is increased by allocating an occupied physical CPU core to a virtual CPU core in a virtual machine in a working system and allocating a shared physical CPU core to a virtual CPU core of a virtual machine in a standby system in a state in which the systems are active. A dedicated activation core, a shared core, or an occupied core is allocated when the respective virtual machines are activated, the resource allocation is changed after the respective virtual machines are activated, and the shared core and the occupied core are appropriately assigned to the working system and the standby system. In a case in which a failure occurs in the virtual machine of the working system, allocation of the shared core allocated to
(Continued)

the other virtual machine in the pair is changed into an occupied state to avoid degradation of performance.

15 Claims, 24 Drawing Sheets

(52) U.S. Cl.
CPC .............. *G06F 2009/45575* (2013.01); *G06F 2201/815* (2013.01)

(58) Field of Classification Search
USPC .......................................................... 714/10
See application file for complete search history.

(56) References Cited

U.S. PATENT DOCUMENTS

| | | | | |
|---|---|---|---|---|
| 2009/0113426 | A1* | 4/2009 | Mizuno | G06F 9/45533 718/1 |
| 2010/0037038 | A1* | 2/2010 | Bieswanger | G06F 9/5094 713/300 |
| 2012/0131379 | A1 | 5/2012 | Tameshige et al. | |

FOREIGN PATENT DOCUMENTS

| | | |
|---|---|---|
| JP | 2011-141609 | 7/2011 |
| JP | 2017-27166 | 2/2017 |

OTHER PUBLICATIONS

Docs.openstack.org, [online], "Flavors," Dec. 21, 2017, retrieved on Dec. 25, 2017, retrieved from URL<https://docs.openstack.org/nova/pike/admin/flavors.html>, 10 pages.

Libvirt.org, [online], "Domain XML Format," Available no later than Feb. 19, 2018, retrieved on Dec. 22, 2017, retrieved from URL<https://libvirt.org./formatdomain.html#elements CPUTuning/>, 91 pages.

* cited by examiner

```
...
<cputune>
  <vcpupin vcpu='0' cpuset='0' />
  <vcpupin vcpu='1' cpuset='0' />
  <vcpupin vcpu='2' cpuset='0' />
<cputune>
...
```
14A

Fig. 9A

```
...
<cputune>
  <vcpupin vcpu='0' cpuset='7' />
  <vcpupin vcpu='1' cpuset='7' />
  <vcpupin vcpu='2' cpuset='7' />
<cputune>
...
```
14B

Fig. 9B

```
                                              ~14C
...
<cputune>
  <vcpupin vcpu='0' cpuset='1' />
  <vcpupin vcpu='1' cpuset='2' />
  <vcpupin vcpu='2' cpuset='3' />
<cputune>
...
```

Fig. 9C

```
...
<vcpu placement='static' cpuset='1,2,3'>3</vcpu>
<cputune>
  <vcpupin vcpu='0' cpuset='1' />
  <vcpupin vcpu='1' cpuset='2' />
  <vcpupin vcpu='2' cpuset='3' />
<cputune>
...
```

Fig. 10A

```
...
<vcpu placement='static' cpuset='7,8,9'>3</vcpu>
<cputune>
  <vcpupin vcpu='0' cpuset='7' />
  <vcpupin vcpu='1' cpuset='8' />
  <vcpupin vcpu='2' cpuset='9' />
<cputune>
...
```

| HW Id | CORE | MULTIPLEXING RATE | UTILIZATION RATE | STATE | ALLOCATION DESTINATION |
|---|---|---|---|---|---|
| #0 | 0 | 100% | 100% | FOR ACTIVATION | — |
| #0 | 1 | 100% | 100% | OCCUPIED | Host OS |
| #0 | 2 | 100% | 100% | OCCUPIED | VM#01 vCPU0 |
| #0 | 3 | 100% | 100% | OCCUPIED | VM#01 vCPU1 |
| ... | ... | ... | ... | ... | ... |
| #0 | 0 | 150% | 150% | FOR ACTIVATION | — |
| #0 | 1 | 150% | 20% | SHARED | VM#02 vCPU0, VM#04 vCPU0 |
|  |  | 150% | 20% | SHARED | VM#02 vCPU1, VM#04 vCPU1 |
| ... | ... | ... | ... | ... | ... |

SERVICE PROVISION SYSTEM, RESOURCE ALLOCATION METHOD, AND RESOURCE ALLOCATION PROGRAM

CROSS-REFERENCE TO RELATED APPLICATIONS

This application is a National Stage application under 35 U.S.C. § 371 of International Application No. PCT/JP2019/005325, having an International Filing Date of Feb. 14, 2019, which claims priority to Japanese Application Serial No. 2018-026723, filed on Feb. 19, 2018. The disclosure of the prior application is considered part of the disclosure of this application, and is incorporated in its entirety into this application.

TECHNICAL FIELD

The present invention relates to a service providing system, a resource allocating method, and a resource allocating program.

BACKGROUND ART

In the past, in a carrier network or the like that provides communication services, various required communication functions, for example, firewalls, packet exchangers, voice exchangers, and the like, would each be implemented by an independent dedicated network device, that is, an individual piece of hardware, and these pieces of hardware would be connected to configure a network.

On the other hand, there has been a recent trend of adopting network functions virtualization (NFV) to which virtualization technologies are applied. Network virtualization converts network functions that have been implemented using dedicated hardware into a software-based configuration that can operate on a general-purpose server. Application of the virtualization technologies to a carrier network is expected to enable economical balancing between scalability and reliability, quick provision of services, flexible resource allocation in accordance with demands for each service, and service deployment without restriction by the lifetimes of hardware.

Also, it is important to improve availability of a system first in order for the system to be operated 24 hours a day and for 365 days a year. Thus, a system configuration called a high availability (HA) cluster is employed. An HA cluster is for minimizing a system downtime by designing a server machine with redundancy.

In order to implement the virtualization of network functions as described above, a virtual machine (VM) is constructed on hardware of each server, and an application of each required communication function is implemented as software executed on each constructed virtual machine. In other words, each application is configured as a virtual network function (VNF).

In addition, in a case in which a redundant configuration as in an HA cluster is employed, and the redundant configuration is an active/standby configuration, for example, a pair of virtual network functions that implement the same function are prepared in advance, and one of the pair is caused to serve as an active side, namely as a working system while the other of the pair is caused to serve as a standby side, namely a waiting system. In a case in which a failure has occurred in the virtual network function on the active side, instantaneous failover can be made by switching the other virtual network function in the pair from the standby state to the active state.

On the other hand, in order to configure each virtual machine or the aforementioned virtual network function on hardware of each server, it is necessary to allocate hardware that is actually present, namely physical resources, particularly, operation functions, to virtual resources that the virtual machine requires. Specifically, because each processor (CPU) in the server incorporates a plurality of core circuits, or CPU cores for each chip, it is necessary to allocate the physical CPU cores to virtual CPU cores in units of cores.

In consideration of an application of the network virtualization technologies to communication software with high performance requirements, pursuing a real-time property and curving fluctuation of performance are required. In such virtualization, an allocating method of fixedly associating virtual CPUs for satisfying high performance requirements to physical CPUs (CPU cores) is used. This is CPU pinning technology.

For example, NPL1 discloses that CPU pinning is set in "OpenStack", which is a software group for constructing a cloud environment developed as an open source. Specifically, NPL1 discloses that a CPU fixed allocation policy can be described in the format of "hw_cpu_policy=dedicated" in an item "Extra Specs" in a virtual hardware template called "flavor" in "OpenStack". The CPU fixed allocation can be implemented by using a flavor in which a CPU fixed allocation policy is set. However, a flavor is designated for each virtual machine.

Also, NPL2 describes CPU pinning setting in a Linux (trade name) kernel-based virtual machine (KVM). Specifically, NPL2 describes that physical CPUs to be allocated to virtual CPUs can be designated with a setting item of "vcpupin" in a setting file (XML file) of a virtual machine.

Also, NPL3, for example, describes HA technologies. In other words, NPL3 describes that many pieces of communication software have availability increased by employing an HA configuration such as an active/standby (ACT/SBY) configuration or an "N+M configuration". The active/standby configuration is a scheme in which some (one in the case of two systems) of a plurality of same systems prepared for enhancing failure resistance are kept in a standby state and processing is taken over by switching the systems at the time of a failure. On the other hand, in the "N+M configuration", a plurality of auxiliary blades (M) are prepared in a power-off state for multiple working blades (N) such that the auxiliary blades are activated instead of the working blades when an error occurs.

For example, in an active/standby configuration, an active component and a standby component are present, and in a case in which a failure occurs in the active component, it is possible to prevent a service from being stopped or to reduce a stop time to a significantly short time by the standby component taking over processing.

CITATION LIST

Non Patent Literature

NPL1: "Flavors", [online], OpenStack Docs, [searched on Jan. 22, 2018], Internet <URL: https://docs.openstack.org/nova/pike/admin/flavors.html>

NPL2: "libvirt", [online], Domain XML format, [searched on Jan. 22, 2018], Internet <URL: https://libvirt.org/formatdomain.html#elementsCPUTuning/>

NPL3: "Service Availability™ Forum, Application Interface Specification", [online], Availability Management Framework, SAI-AIS-AMF-B.04.01, [searched on Jan. 22, 2018], Internet <URL: http://devel.opensaf.org/SAI-AIS-AMF-B.04.01.AL.pdf>

SUMMARY OF THE INVENTION

Technical Problem

In a case in which the aforementioned HA configuration is employed, it is necessary to cause a plurality of components with HA configurations to operate on mutually different pieces of hardware in consideration of occurrence of a failure in the hardware. Also, in a case in which the virtualization technologies are applied to communication software, and the active/standby configuration is employed, active-side virtual machines that implement virtual network functions on the active side and standby-side virtual machines that implement virtual network functions on the standby side are both prepared, and are disposed on different pieces of hardware.

In addition, if the communication software applied in a configuration such as that described above has high performance requirements, it is necessary to employ a method such as CPU pinning described above, for example, and to construct the active-side virtual machines in a state in which hardware resources are occupied. Also, a necessity to prepare as many as resources for the standby-side virtual machines as well occurs in order to secure the same performance as that on the active side.

However, the standby-side virtual machines do not operate when no failure has occurred, and thus a waste increases if hardware resources with high performance are fixedly allocated to the standby-side virtual machines. In other words, preparing the same hardware resources for both the active side and the standby side prevents resource utilization efficiency from increasing and inhibits advantages of the virtualization technologies.

The present invention was made in view of the aforementioned circumstances, and an object of the present invention is to provide a service providing system, a resource allocation method, and a resource allocation program capable of securing performance of virtual machines in a working system and improving resource utilization efficiency in the entire systems including virtual machines in a standby system.

Means for Solving the Problem (1) A service providing system operable to configure an application function by a first virtual machine and a second virtual machine that form a pair together, to set the first virtual machine in an active state and the second virtual machine in a standby state at least in an initial state, and to use the first virtual machine or the second virtual machine in the active state to provide the service, the application function being able to provide a desired service, the service providing system comprising: a plurality of hardware computer resources capable of being allocated to the first virtual machine and the second virtual machine; an initial resource allocation unit configured to allocate any of the plurality of hardware computer resources to the first virtual machine and the second virtual machine in accordance with predefined initial conditions when the first virtual machine and the second virtual machine are activated: and a resource allocation change unit configured to set the any of the plurality of hardware computer resources to be allocated to the first virtual machine in a state of being occupied or executed with high priority by the first virtual machine, and set the any of the plurality of hardware computer resources to be allocated to the second virtual machine in a state of being able to be shared by the second virtual machine and other virtual machines, at least before the service is started.

According to this service providing system, it is possible to allocate sufficient computer resources such that the first virtual machine satisfies required performance by the resource allocation change unit allocating, for example, occupied computer resources to the first virtual machine. Also, it is possible to increase the utilization efficiency of the computer resources in the entire systems by the resource allocation change unit allocating shared computer resources to the second virtual machine. Further, the initial resource allocation unit allocates the computer resources in the predefined initial conditions in the initial state, and thus it is possible to stabilize operations of the entire system when the respective virtual machines are activated and to enhance utilization efficiency of the computer resources.

(2) The service providing system described above in (1), wherein the initial resource allocation unit selects a predefined activation core from among the plurality of hardware computer resources and allocates the activation core to the first virtual machine and the second virtual machine in an initial state, and the resource allocation change unit changes computer resource allocation to the first virtual machine and the second virtual machine.

According to this service providing system, the computer resources allocated to the first virtual machine and the second virtual machine in the initial state are limited to the specific activation cores, and thus it is possible to stabilize operations of the entire system when the respective virtual machines are activated. In other words, there is a probability that a significantly large load is imparted on computer resources such as CPUs when the virtual machines are activated. However, it is possible to avoid influences of variations in load at the time of activation on the other virtual machines by activating new virtual machines with the activation cores that are independent from the computer resources allocated to the other virtual machines that have already operated. Further, the resource allocation change unit changes the allocation of the computer resources for the first virtual machine and the second virtual machine. In this manner, it is possible to increase the utilization efficiency of the computer resources in the entire system.

(3) The service providing system described above in (1), wherein the initial resource allocation unit selects a shared core that is able to be commonly used by a plurality of virtual machines from among the plurality of hardware computer resources and allocates the shared core to the first virtual machine and the second virtual machine in an initial state, and the resource allocation change unit changes computer resource allocation to the first virtual machine and the second virtual machine.

According to this service providing system, the plurality of virtual machines use the shared cores that can be shared regardless of which of the first virtual machine and the second virtual machine is to be activated, and thus it is possible to increase the utilization efficiency of the computer resources. Also, it is possible to curb influences of variations in load at the time of activation on the other virtual machines in the active state that has already operated. Further, the resource allocation change unit changes the allocation of the computer resources for the first virtual machine and the second virtual machine. In this manner, it is possible to increase the utilization efficiency of the computer resources in the entire system.

(4) The service providing system described above in (1), wherein the initial resource allocation unit selects occupied cores occupied or executed with high priority by a single virtual machine from among the plurality of hardware computer resources and allocates the occupied cores to the first virtual machine and the second virtual machine in an initial state, and the resource allocation change unit changes computer resource allocation to the second virtual machine without changing computer resource allocation to the first virtual machine.

According to this service providing system, it is possible to complete the allocation operation and directly start to provide the service for the first virtual machine without the resource allocation change unit changing the allocation of the computer resources. Thus, it is possible to shorten a delay time until the service is started after the service is requested. Further, although the resource allocation change unit changes the computer resource allocation to the second virtual machine, the second virtual machine is in the standby state, and thus a time required to change the allocation does not affect the delay time until the service is started.

(5) The service providing system described above in any one of (1) to (4), further comprising a failure case control unit configured to detect occurrence of a failure in the first virtual machine in the active state, and in a case in which the any of the plurality of the hardware computer resources allocated to the second virtual machine is a shared core that is able to be shared by a plurality of virtual machines, remove virtual machines other than the second virtual machine from allocation destinations of the shared core.

According to this service providing system, the second virtual machine is switched from the standby state to the active state, and it is not necessary to change the allocation of the computer resources to the second virtual machine in a case in which a failure occurs in the first virtual machine. Moreover, the other virtual machines are excluded from using the shared cores allocated to the second virtual machine, and thus computer resources that satisfy performance necessary for the second virtual machine in the active state are allocated as a result. Thus, it is possible to minimize interruption or a delay of the service associated with failover at the time of a failure.

(6) The service providing system described above in any one of (1) to (4), further comprising a failure case control unit configured to detect occurrence of a failure in the first virtual machine in the active state, and in a case in which the any of the plurality of the hardware computer resources allocated to the second virtual machine is a shared core that is able to be shared by a plurality of virtual machines, secure new occupied cores that are able to be occupied or used with priority from among the plurality of hardware computer resources, and allocate the new occupied cores to the second virtual machine.

According to this service providing system, it is possible to complete re-allocation of the new occupied cores to the second virtual machine in a short period of time even in a case in which the computer resources allocated to the second virtual machine immediately after occurrence of a failure are used in a state in which multiple other virtual machines share the resources. Thus, it is possible to recover degradation of performance of the second virtual machine, which occurs due to sharing of the same computer resources, in a short period of time.

(7) A resource allocation method for controlling a system operable to configure an application function by a first virtual machine and a second virtual machine that form a pair together, to set the first virtual machine in an active state, and the second virtual machine in a standby state at least in an initial state, and to use the first virtual machine or the second virtual machine in the active state to provide the service, the application function being able to provide a desired service, the method comprising: allocating any of a plurality of hardware computer resources prepared in advance to the first virtual machine and the second virtual machine in accordance with predefined initial conditions when the first virtual machine and the second virtual machine are activated; and setting the any of the plurality of hardware computer resources to be allocated to the first virtual machine in a state of being occupied or executed with high priority by the first virtual machine and setting the any of the plurality of hardware computer resources to be allocated to the second virtual machine in a state of being able to be shared by the second virtual machine and other virtual machines, at least before the service is started.

According to this resource allocation method, it is possible to allocate sufficient computer resources such that the first virtual machine satisfies required performance by allocating the occupied computer resources to the first virtual machine. Also, it is possible to increase the utilization efficiency of the computer resources in the entire system by allocating the shared computer resources to the second virtual machine. Further, the computer resources are allocated in accordance with the predefined initial conditions in the initial state, and thus it is possible to stabilize the operations of the entire system when the respective virtual machines are activated and to increase the utilization efficiency of the computer resources.

(8) A resource allocation program executable by a computer operable to control a system operable to configure an application function by a first virtual machine and a second virtual machine that form a pair together, to set the first virtual machine in an active state, and the second virtual machine in a standby state at least in an initial state, and to use the first virtual machine or the second virtual machine in the active state to provide the service, the application function being able to provide a desired service, the program comprising: in an initial resource allocation, allocating any of a plurality of hardware computer resources prepared in advance to the first virtual machine and the second virtual machine in accordance with predefined initial conditions when the first virtual machine and the second virtual machine are activated; and in a resource allocation change setting the any of the plurality of hardware computer resources to be allocated to the first virtual machine in a state of being occupied or executed with high priority by the first virtual machine and setting the any of the plurality of hardware computer resources to be allocated to the second virtual machine in a state of being able to be shared by the second virtual machine and other virtual machines, at least before the service is started.

In a case in which this resource allocation program is executed by a predetermined computer to control the system, the occupied computer resources are allocated, for example, to the first virtual machine, and thus it is possible to allocate sufficient computer resources such that the first virtual machine satisfies required performance. Also, it is possible to increase the utilization efficiency of the computer resources in the entire system by allocating the shared computer resources to the second virtual machine. Further, the computer resources are allocated in accordance with the predefined initial conditions in the initial state, and thus it is possible to stabilize the operations of the entire system when the respective virtual machines are activated and to increase the utilization efficiency of the computer resources.

Effects of the Invention

According to the service providing system, the resource allocation method, and the resource allocation program of one embodiment of the present invention, it is possible to secure performance of virtual machines in a working system and to improve resource utilization efficiency of the entire system including virtual machines in a standby system.

BRIEF DESCRIPTION OF DRAWINGS

FIG. 9A is a schematic diagram representing a description example of content of a virtual machine setting file when a virtual machine is activated.

FIG. 9B is a schematic diagram representing a description example of content of the virtual machine setting file when the virtual machine is activated.

FIG. 9C is a schematic diagram representing a description example of content of the virtual machine setting file when the virtual machine is activated.

FIG. 10A is a schematic diagram representing a description example of content of an active-side virtual machine setting file after allocation is changed.

FIG. 10B is a schematic diagram representing a description example of content of a standby-side virtual machine setting file after allocation is changed.

FIG. 16 is a schematic diagram illustrating a configuration example of a resource management table.

DESCRIPTION OF EMBODIMENTS

Embodiments of the present invention will be described below with reference to the respective drawings.

Basic Configuration Example of Communication System

Figure 1A:
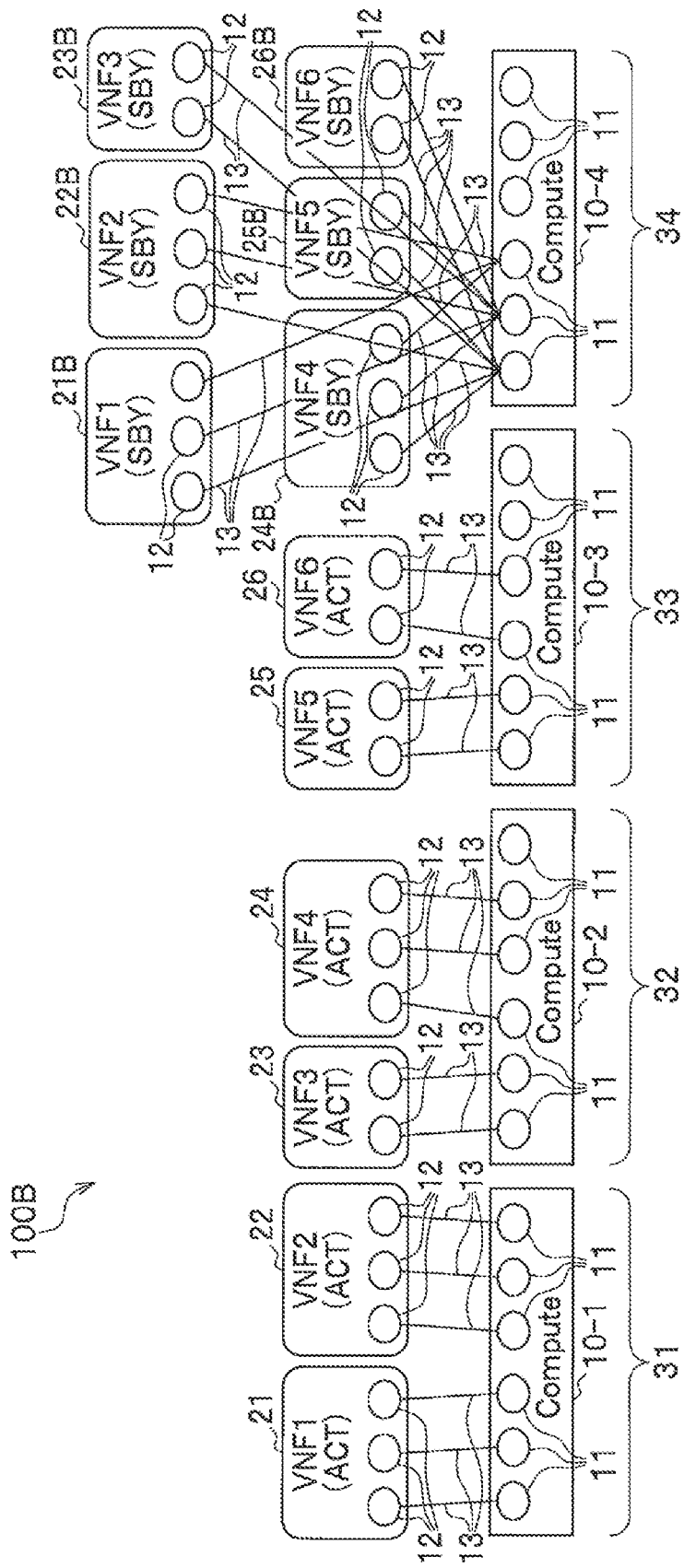
FIG. 1A is a block diagram illustrating a configuration example of a system for providing a communication service according to an embodiment of the present invention.
Figure 1B:
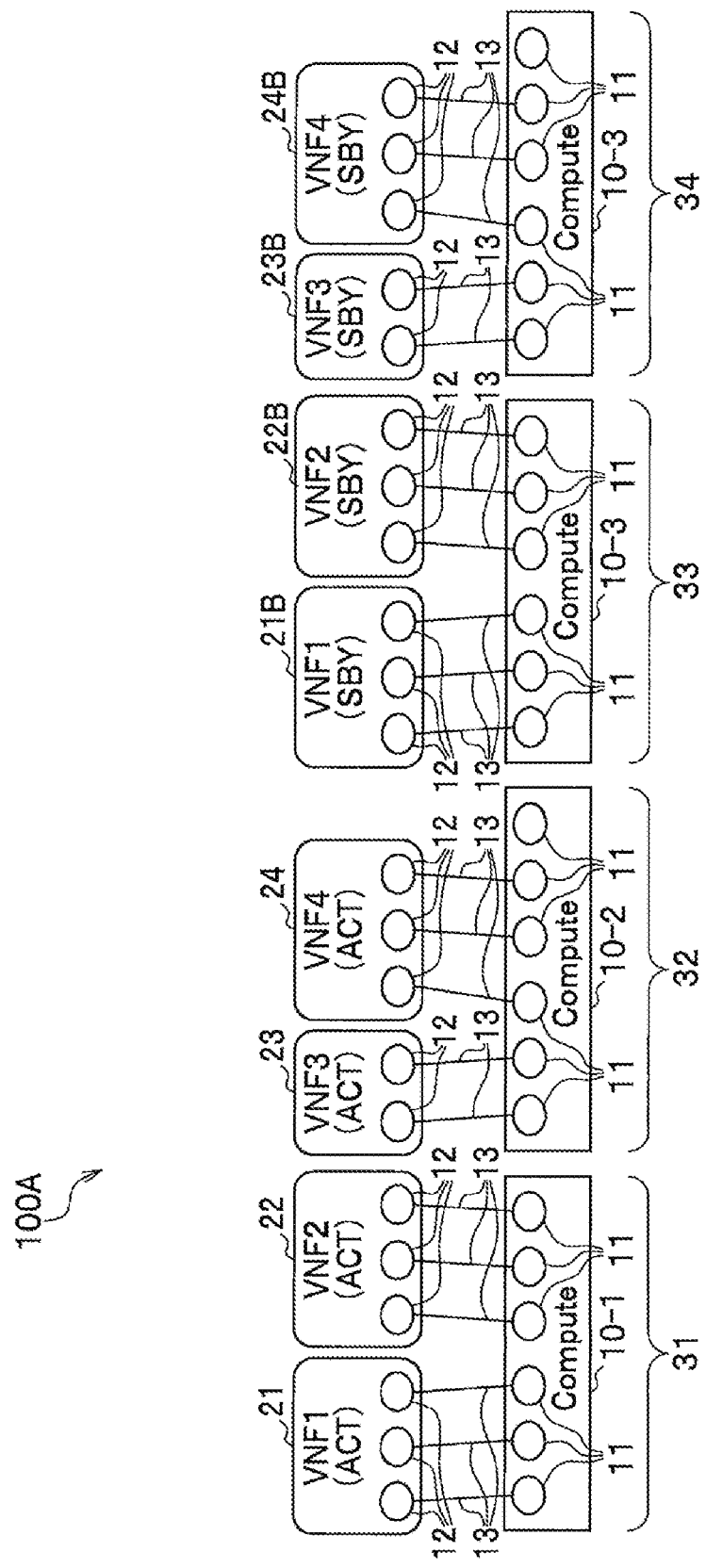
FIG. 1B is a block diagram illustrating a configuration example of a system for providing a communication service according to a comparative example.

A basic configuration example of a system configured to provide a communication service in a constant state is illustrated in each of FIGS. 1A and 1B. Note that an apparatus configured to manage the system is omitted in FIGS. 1A and 1B.

The configuration shown in FIG. 1B is a typically assumed configuration, and FIG. 1A represents a configuration assuming the improved configuration of FIG. 1B. For easiness of understanding, the configuration illustrated in FIG. 1B will be described first.

A service providing system 100A according to the comparative example illustrated in FIG. 1B includes a plurality of servers 31, 32, 33, and 34. The servers 31 to 34 incorporate physical resources 10-1, 10-2, 10-3, and 10-4, that is, hardware of electronic circuits necessary for operations of computers.

Also, the respective physical resources 10-1 to 10-4 each incorporate a plurality of independent physical CPU cores 11. Hardware of actual processors (CPUs) is present as one semiconductor or a plurality of semiconductor integrated circuit chips mounted on one or a plurality of circuit substrates. In addition, a package of each chip includes a plurality of core circuits capable of operating mutually independently, that is, a plurality of physical CPU cores in many cases. Thus, in a case in which such computer resources are managed, it is necessary to manage the resources in an independent state for each CPU core.

In the example illustrated in FIG. 1B, virtual network functions 21 and 22 are disposed on the server 31, virtual network functions 23 and 24 are disposed on the server 32, virtual network functions 21B and 22B are disposed on the server 33, and virtual network functions 23B and 24B are disposed on the server 34.

These respective virtual network functions 21 to 24 and 21B to 24B correspond to various communication functions required by a carrier network or the like that provides a communication service, for example, a firewall, a packet exchanger, a sound exchanger, and the like. However, the network function virtualization technology NFV is employed here, and thus the respective virtual network functions 21 to 24 and 21B to 24B are present as virtual network functions VNF.

In other words, the respective virtual network functions VNF are implemented by virtual machines (VM) that operate on general-purpose server hardware executing application software incorporated therein. For example, the virtual network functions 21 to 24 illustrated in FIG. 1B are used as virtual network functions VNF1, VNF2, VNF3, and VNF4 that achieve mutually different functions.

On the other hand, it is necessary to cause the system to operate without resting, and thus the service providing system 100A illustrated in FIG. 1B is adapted on the assumption of a case in which a redundant configuration such as an HA cluster is employed. In other words, a pair of virtual network functions that implement the same functions are prepared in advance, and one of the pair is caused to serve as an active side, that is, a working system ACT, while the other one of the pair is caused to serve as a standby side, that is, a standby system SBY. In a case in which a failure has occurred in the virtual network function on the active side, instantaneous failover can be made by switching the other virtual network function in the pair from the standby state to the active state.

The example of FIG. 1B assumes a state in which the respective virtual network functions 21 to 24 operate as a working system ACT and the virtual network functions 21B to 24B serve as standby system SBY. Thus, in a case in which a failure occurs in the virtual network function VNF1 of the working system ACT, for example, the virtual network function VNF1 of the standby system SBY that forms a pair with the virtual network function VNF1, that is, the virtual network function 21B, can be switched from the standby system SBY to the working system ACT and can continue to provide the same communication service instead of the virtual network function 21.

On the other hand, in order to actually configure the virtual network functions 21 to 24 and 21B to 24B, it is necessary to construct virtual machines capable of executing the respective pieces of application software on the one to one correspondent servers 31 to 34. In the example of FIG. 1B, the different virtual network functions 21 to 24 and 21B to 24B are each implemented on the independent virtual machines.

Also, in order to implement the respective virtual machines, it is necessary to secure hardware functions available for the respective virtual machines. Thus, physical CPU cores 11 are allocated to one or a plurality of virtual CPU cores 12 included in each virtual machine. In the configuration illustrated in FIG. 1B, the physical CPU core 11 and the virtual CPU core 12 are individually linked in one-to-one correspondence and are associated by a link 13.

Thus, in the configuration illustrated in FIG. 1B, any of the virtual machines of the virtual network functions 21 to 24 and 21B to 24B can use the mutually independent physical CPU cores 11 in a state in which the physical CPU core 11 is occupied by the virtual machine itself. In other words, because performance of each physical CPU core 11 does not change, performance of each virtual machine that uses the physical CPU core 11 as the virtual CPU core 12 is not affected by other virtual machines and does not change. Thus, it is possible to easily ensure performance required by the virtual network functions 21 to 24.

Also, the physical CPU cores 11 are allocated to each of the virtual CPU cores 12 in an occupied state not only to the working systems ACT but also to the virtual network functions 21B to 24B of the standby system SBY in the example in FIG. 1B. Thus, it is possible to easily ensure the performance required by the respective virtual network functions 21B to 24B even in a case in which the virtual network functions 21B to 24B are switched from the standby systems SBY to the working systems ACT.

However, the respective virtual network functions 21B to 24B of the standby systems SBY are not switched to the working systems ACT on the assumption that no failure occurs at all, and thus all the physical CPU cores 11 allocated to the respective virtual network functions 21B to 24B are kept in an unused state. This significantly decreases the utilization efficiency of resources, that is, computer hardware in the entire systems. However, it is necessary to ensure performance when a failure actually occurs, and thus it is necessary to allocate sufficient resources to the respective virtual network functions 21B to 24B of the standby systems SBY as well similarly to the working systems ACT.

Thus, employment of a configuration like that of the service providing system 100B illustrated in FIG. 1A instead of the configuration in FIG. 1B is assumed in order to improve utilization efficiency of the resources. The configuration of FIG. 1A will be described below.

The service providing system 100B according to an embodiment of the present invention illustrated in FIG. 1A includes a plurality of servers 31, 32, 33, and 34 similarly to the configuration in FIG. 1B. The servers 31 to 34 incorporate physical resources 10-1, 10-2, 10-3, and 10-4, that is, hardware of electronic circuits necessary for operations of computers. Also, the respective physical resources 10-1 to 10-4 each incorporate a plurality of independent physical CPU cores 11.

In the example illustrated in FIG. 1A, virtual network functions 21 and 22 are disposed on the server 31, virtual network functions 23 and 24 are disposed on the server 32, and virtual network functions 25 and 26 are disposed on the server 33. Also, virtual network functions 21B, 22B, 23B, 24B, 25B, and 26B are disposed on the server 34.

Because the configuration in FIG. 1A employs the virtualization technology NFV of the network functions, the respective virtual network functions 21 to 26 and 21B to 26B are present as virtual network functions VNF. Also, the virtual network function 21 of a working system ACT and the virtual network function 21B of a standby system SBY form, as a pair, a virtual network function VNF1 with redundancy.

Similarly, the virtual network functions 22 and 22B form, as a pair, a virtual network function VNF2 with redundancy. Also, the virtual network functions 23 and 23B form, as a pair, a virtual network function VNF3 with redundancy. Also, the virtual network functions 24 and 24B form, as a pair, a virtual network function VNF4 with redundancy. Also, the virtual network functions 25 and 25B form, as a pair, a virtual network function VNF5 with redundancy. Also, the virtual network functions 26 and 26B form, as a pair, a virtual network function VNF6 with redundancy.

The respective virtual network functions VNF1 to VNF6 illustrated in FIG. 1A are implemented by virtual machines that operate on general-purpose server hardware executing application software incorporated therein.

In the configuration illustrated in FIG. 1A, a physical CPU core 11 of the physical resource 10-1 is allocated to each virtual CPU core 12 of the virtual network function 21 in one-to-one correspondence. Also, a physical CPU core 11 of the physical resource 10-1 is allocated to each virtual CPU core 12 of the virtual network function 22 in one-to-one correspondence. In other words, the respective virtual machines of the virtual network functions 21 and 22 can use the physical CPU cores 11 of the physical resource 10-1 in an occupied state.

Similarly, a physical CPU core 11 of the physical resource 10-2 is allocated to each virtual CPU core 12 of the virtual network function 23 in one-to-one correspondence, and a physical CPU core 11 of the physical resource 10-2 is allocated to each virtual CPU core 12 of the virtual network function 24 in one-to-one correspondence. Also, a physical CPU core 11 of the physical resource 10-3 is allocated to each virtual CPU core 12 of the virtual network function 25 in one-to-one correspondence, and a physical CPU core 11 of the physical resource 10-3 is allocated to each virtual CPU core 12 of the virtual network function 26 in one-to-one correspondence.

On the other hand, the virtual CPU cores 12 of the virtual machines of the virtual network functions 21B, 22B, 23B, 24B, 25B, and 26B are allocated to a common physical CPU core 11 on the physical resource 10-4 and are individually associated with a link 13. In other words, the physical CPU core 11 is allocated to each of the virtual network functions 21 to 26 of the working system ACT in a single virtual machine occupied state. Also, the common physical CPU core 11 is allocated to the virtual network functions 21B to 26B of the standby systems SBY in a state in which the physical CPU core 11 is shared by the plurality of virtual machines. Note that the common physical core includes not only a physical core that is actually shared by a plurality of virtual machines but also a physical core that is in an idling state and can be shared by a plurality of virtual machines.

In other words, the virtual network functions 21B to 26B of the standby systems SBY do not require hardware computer resources with high ability in a situation in which the virtual network functions 21B to 26B are still the standby systems. Thus, it is possible to perform resource allocation to the virtual network functions 21B to 26B of the standby systems SBY such that the common physical CPU core 11 is shared by the plurality of virtual machines as illustrated in FIG. 1A.

The resource utilization efficiency of the entire system is improved in the configuration in FIG. 1A and thus it is possible to increase the number of the virtual network functions VNF to VNF6 from four to six using the same hardware as that in FIG. 1B.

However, the number of virtual network functions VNF1 to VNF6 increases or decreases with a change in situation in an actual system. Also, the working systems ACT and the standby systems SBY are switched with occurrence of a failure, and it becomes necessary to prepare new working systems ACT and standby systems SBY. In other words, it is not possible to fixedly allocate the resources from the beginning as in the configuration illustrated in FIG. 1A. Also, there is a risk that necessary performance will be unable to be obtained through allocation of the shared resource in a case in which the standby systems SBY of the respective virtual network functions VNF1 to VNF6 are switched to the working systems ACT.

Configuration Example of Service Providing System

Figure 2:
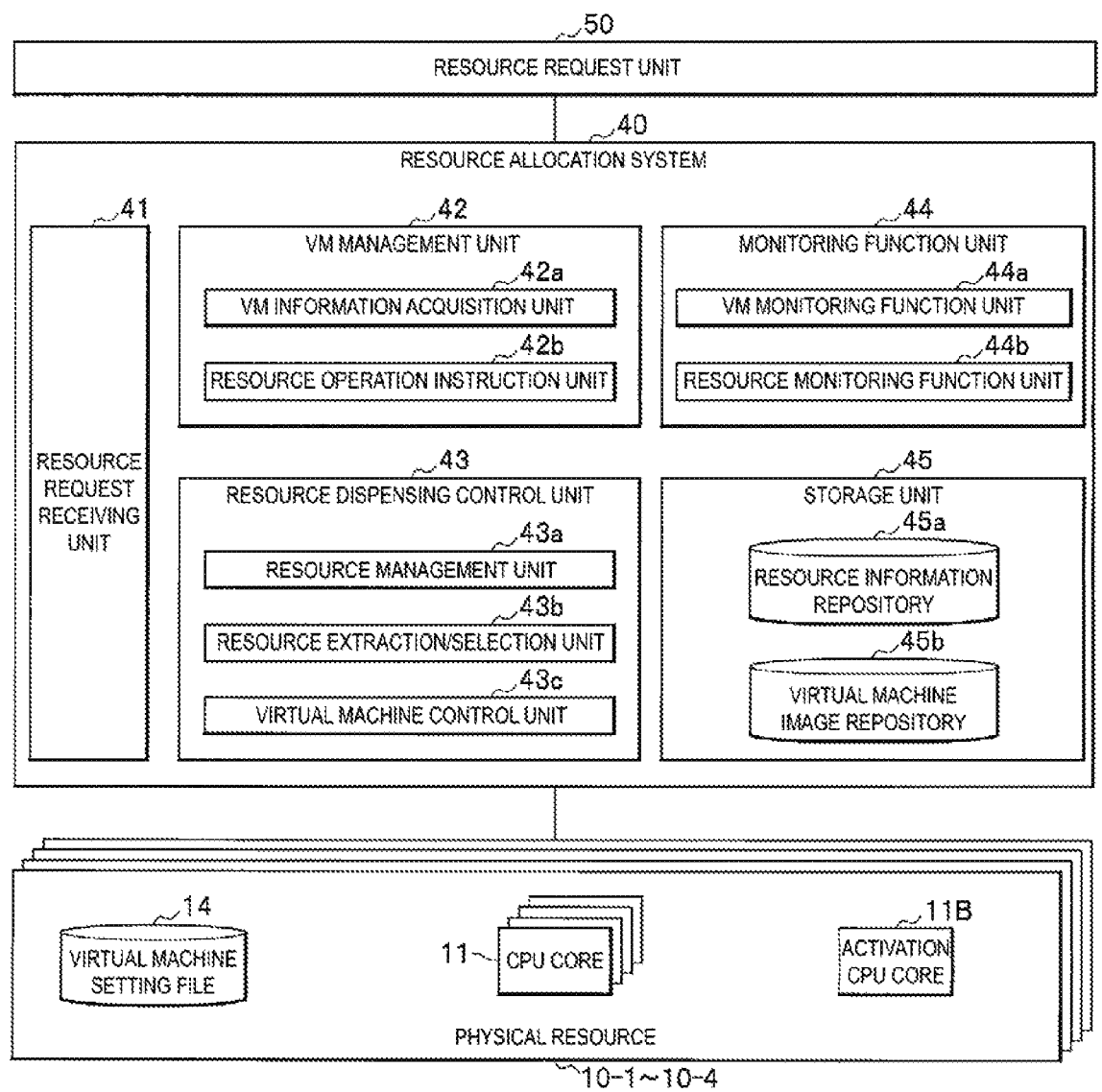
FIG. 2 is a block diagram illustrating a configuration example of a service providing system provided with components necessary for implementing the present invention.

A configuration example of the service providing system provided with components necessary to implement the present invention is illustrated in FIG. 2. In other words, the service providing system illustrated in FIG. 2, implements the respective virtual machines and the virtual network functions VNF in addition to hardware necessary to implement the system configuration as illustrated in FIG. 1A, for example, and includes a management function for allocating resources to the virtual machines and the virtual network functions VNF.

The resource allocation system 40 illustrated in FIG. 2 follows a request from a resource request unit 50 and allocates physical resources 10-1 to 10-4 to be controlled to the respective virtual machines. Also, the resource allocation system 40 automatically changes allocation of the physical resources 10-1 to 10-4 in accordance with a change in situation.

The physical resources 10-1 to 10-4 incorporate a plurality of physical CPU cores 11 that operate mutually independently. Also, an activation core 11B prepared in advance for the time when the virtual machines are activated is also included in each of the physical resources 10-1 to 10-4 in the configuration in FIG. 2. The respective physical CPU cores 11 and the activation core 11B are actually present as hardware inside the servers 31 to 34 illustrated in FIG. 1A, for example.

In the configuration in FIG. 2, a virtual machine setting file 14 is included in each of the physical resources 10-1 to 10-4. The virtual machine setting file 14 is used to hold information representing a setting state of each constructed virtual machine. If the resource allocation system 40 allocates the physical resources to the respective virtual machines, the result is reflected in content of the virtual machine setting file 14.

The resource allocation system 40 illustrated in FIG. 2 includes a resource request receiving unit 41, a VM management unit 42, a resource dispensing control unit 43, a monitoring function unit 44, and a storage unit 45. The resource request receiving unit 41 receives a request from the resource request unit 50 and starts operations of managing corresponding virtual machines and allocating the physical resources.

The VM management unit 42 includes a VM information acquisition unit 42a and a resource operation instruction unit 42b. The VM information acquisition unit 42a of the VM management unit 42 acquires information regarding operating states of the respective virtual machines (VM) of the working systems ACT and the standby systems SBY. The resource operation instruction unit 42b provides an instruction for setting CPU pinning to the resource dispensing control unit 43. In other words, the VM management unit 42 provides an instruction for fixedly allocating the respective CPU cores 11 to the respective virtual CPU cores 12 in a predefined state as in the state illustrated in FIG. 1A or the state illustrated in FIG. 1B, for example.

The resource dispensing control unit 43 includes a resource management unit 43a, a resource extraction/selection unit 43b, and a virtual machine control unit 43c. The resource management unit 43a manages the available respective physical resources. The resource extraction/selection unit 43b performs extraction and selection of allocatable physical resources. The resource dispensing control unit 43 performs resource dispensing control on the basis of a dispensing request from the resource request unit 50 and an instruction for setting CPU pinning from the VM management unit 42. Also, the resource dispensing control unit 43 performs control such as activation, ending, and the like of the respective virtual machines.

The monitoring function unit 44 includes a VM monitoring function unit 44a and a resource monitoring function unit 44b. The monitoring function unit 44 monitors the respective virtual machines and physical resources. For example, operation information called a heartbeat is periodically transmitted and received between the virtual machines of the working systems ACT and the virtual machines of the standby systems SBY. It is possible to identify whether or not the respective virtual machines are operating normally by the VM monitoring function unit 44a checking the operation information. The resource monitoring function unit 44b monitors allocated states of the respective physical CPU cores 11 and 11B in the physical resources 10-1 to 10-4 and whether or not a problem has occurred.

The storage unit 45 includes a resource information repository 45a and a virtual machine image repository 45b. The storage unit 45 is a database for managing resource utilization statuses of the physical resources 10-1 to 10-4 and the respective virtual machine images in a centralized manner.

Operation Example-1 of Resource Allocation

Figure 3A:
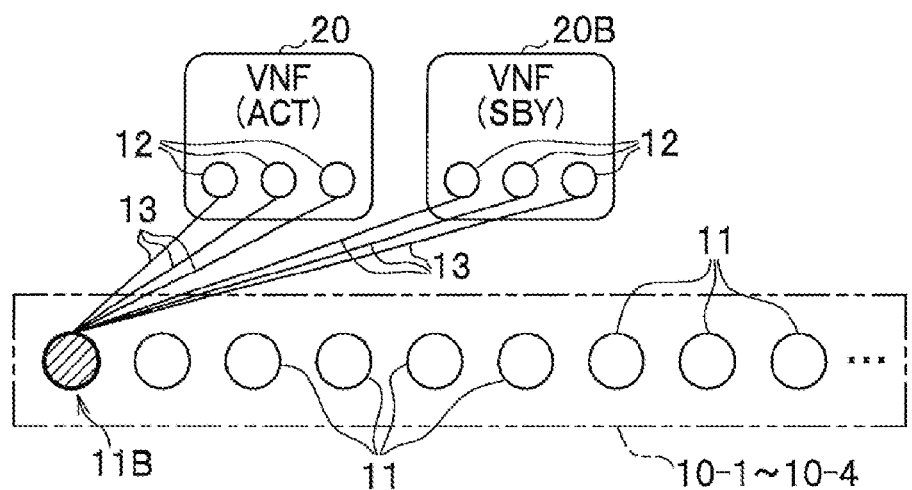
FIG. 3A is a block diagram illustrating an example of an allocated state of virtual cores and physical cores that configure respective virtual machines when the virtual machines are activated.
Figure 3B:
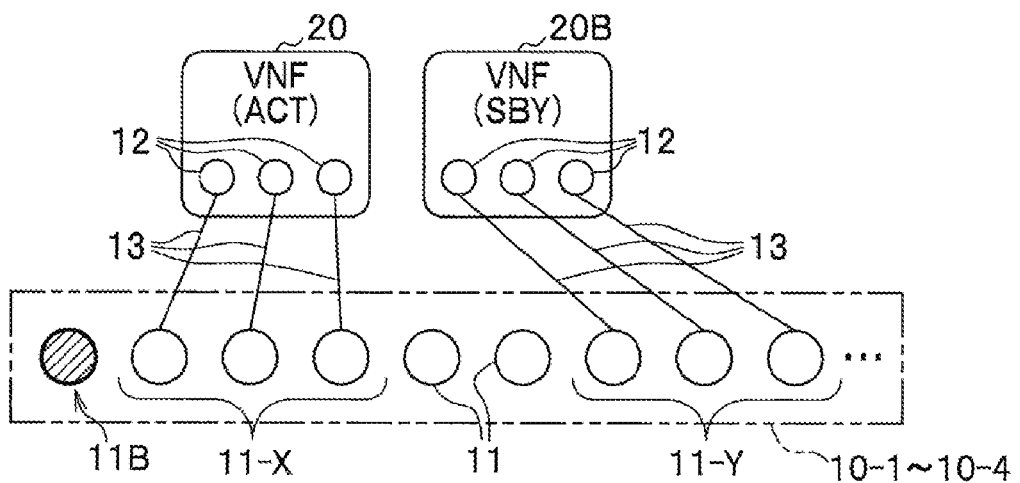
FIG. 3B is a block diagram illustrating an example of an allocated state of the virtual cores and the physical cores that configure the respective virtual machines after the allocation is changed.

FIGS. 3A and 3B illustrates an example of a state in which virtual cores and physical cores configuring each virtual machine are allocated. FIG. 3A represents an allocated state when the virtual machine is activated, and FIG. 3B represents a state after an allocation change. In this operation example, the resource dispensing control unit 43 functions as an initial resource allocation unit selecting predefined activation cores from among a plurality of hardware computer resources. The resource allocation change unit functions as a resource allocation change unit that changes allocation of computer resources for the virtual machines of the working systems ACT and the virtual machines of the standby systems SBY.

In the configuration illustrated in FIG. 3A, the activation core 11B prepared in advance in the physical CPU cores 11 on the physical resources 10-1 to 10-4 is allocated to the virtual network functions 20 and 20B. In other words, the resources are allocated such that all the virtual CPU scores 12 of the virtual network function 20 of the working system ACT and the virtual network function 20B of the standby system SBY, which have the same function, share only the common activation core 11B. Thus, the activation core 11B and the respective virtual CPU cores 12 of the virtual network functions 20 and 20B are associated with each other through the link 13.

There is a high probability that a significantly large load is temporarily imparted on resources such as the physical CPU cores 11 when the virtual machines are activated. Thus, there is a probability that virtual machines newly activated degrade performance of other virtual machines that have already operated in a case in which the other virtual machines that have already operated share the same physical CPU cores 11, for example. However, the other virtual machines that have already operated are not affected by limiting the resource to be used at the time of the activation only to the activation core 11B as in FIG. 3A, and it is thus possible to continue to provide the service in a stable state.

Meanwhile, a plurality of occupied cores 11-X on the physical resources 10-1 to 10-4 are allocated to virtual CPU cores 12 in the virtual network function 20, and these are associated with each other through the link 13 in the configuration illustrated in FIG. 3B. Also, a plurality of shared cores 11-Y on the physical resources 10-1 to 10-4 are allocated to the virtual CPU cores 12 in the virtual network function 20B, and these are associated with each other through the link 13.

The occupied cores 11-X are provided with conditions by a CPU pinning method such that the allocated physical CPU cores 11 and the virtual CPU cores 12 can be used only in a one-to-one state. Thus, once an occupied core 11-X is allocated to one virtual CPU core 12, and it is not possible to allocate the occupied core 11-X to another virtual CPU core 12.

The shared cores 11-Y are provided with conditions such that the virtual CPU cores 12 of the plurality of virtual machines can share the shared cores 11-Y. Thus, even if a shared core 11-Y is allocated to another virtual CPU core 12, the shared core 11-Y can be allocated to another virtual CPU core 12 at the same time on resource allocation.

Note that the aforementioned respective occupied cores 11-X and shared cores 11-Y are not necessarily fixedly allocated in advance. In other words, it is possible to secure the occupied cores 11-X and the shared cores 11-Y as needed by providing conditions to the respective physical CPU cores 11 in accordance with situations. For example, there may be vacant physical CPU cores 11 that are neither the occupied cores 11-X nor the shared cores 11-Y, and the vacant physical CPU cores 11 may become the occupied cores 11-X or the shared cores 11-Y by disposing virtual machines at the vacant physical CPU cores 11.

In addition, it is also possible to perform the same resource allocation as that of the occupied cores 11-X using a method other than the CPU pinning. If adjustment is made such that execution priorities of the respective physical CPU cores 11 differ between the working systems ACT and the standby systems SBY, for example, it is possible to implement resources that have performance that is equivalent to that of the occupied cores 11-X and the shared cores 11-Y. Specifically, it is possible to implement such resources by adjusting a value of "share" of an item <cputune> in the virtual machine setting file, namely an XML file, in a case of a Kernel-based virtual machine (KVM) environment.

The configuration illustrated in FIG. 3B is equivalent to the configuration illustrated in FIG. 1A. In other words, the virtual machine of the virtual network function 20 of the working system ACT can occupy the occupied cores 11-X allocated to the virtual CPU cores 12, and thus it is possible to secure sufficient resources to ensure required performance in the configuration in FIG. 3B. In addition, the shared cores 11-Y allocated to the virtual CPU cores 12 of the virtual machines in the virtual network function 20B of the standby system SBY can also be allocated to and share by other virtual machines at the same time, and thus it is possible to increase the utilization efficiency of the physical resources.

However, the number of virtual network functions VNF1 to VNF6 illustrated in FIG. 1A, for example, increases or decreases with a change in situation in an actual system. Also, the working systems ACT and the standby systems SBY are switched with occurrence of a failure, and it becomes necessary to prepare new working systems ACT and standby systems SBY. Thus, fixed allocation of the resources as in the configuration illustrated in FIG. 3B is not possible from the beginning. Also, there is a probability that necessary performance cannot be obtained due to allocation of the shared resources in a case in which the standby systems SBY of the virtual network functions VNF are switched to the working systems ACT.

Thus, resources are allocated such that the configuration as illustrated in FIG. 3A is obtained when the respective virtual machines are activated in the embodiment. Then, the allocation of the resources is changed from the state illustrated in FIG. 3A and is switched to the state illustrated in FIG. 3B. In other words, control is performed as described below.

Figure 4:
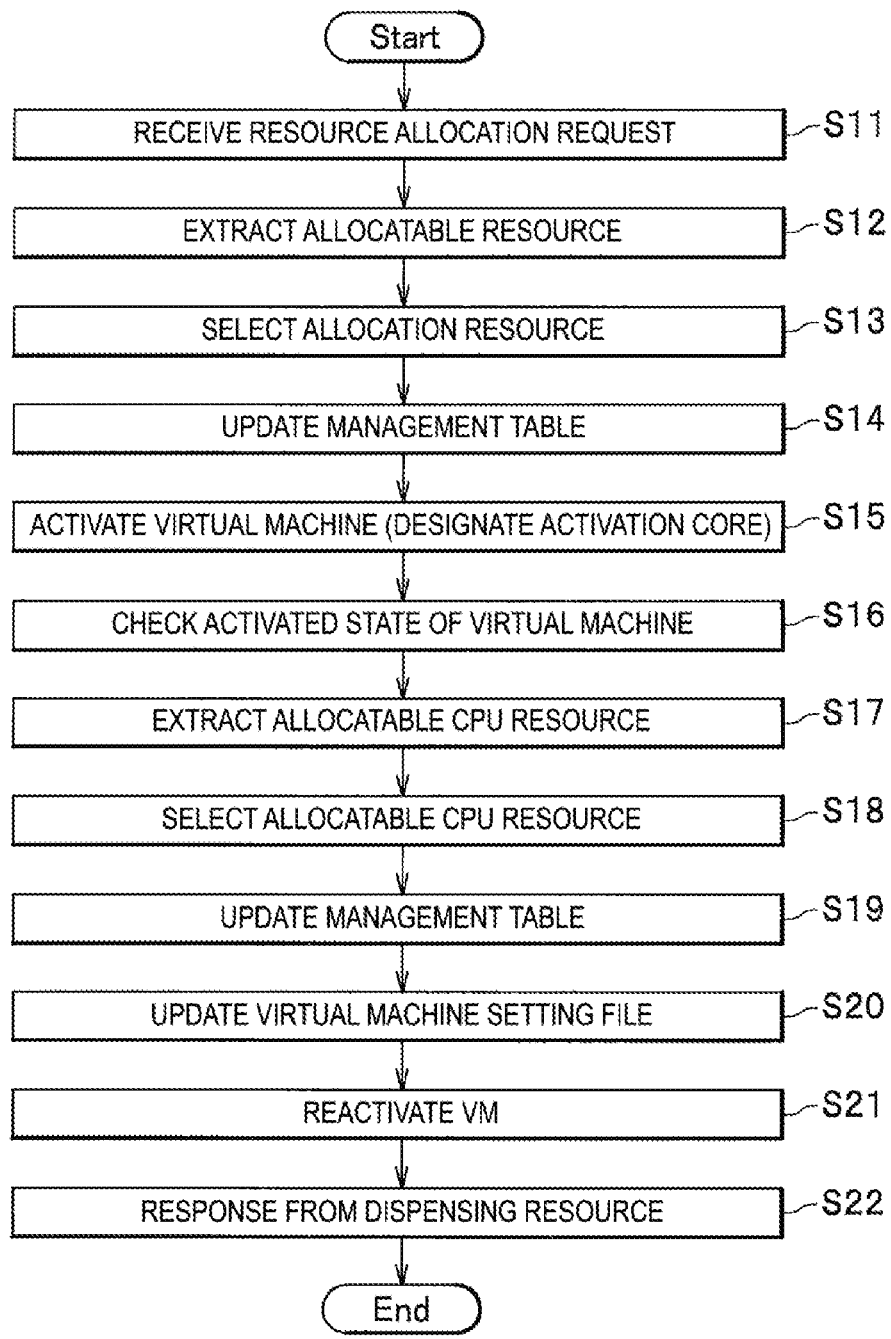
FIG. 4 is a flowchart illustrating an example of operations for implementing resource allocation.

An operation example for implementing resource allocation as illustrated in FIGS. 3A and 3B is illustrated in FIG. 4. In other words, it is possible to allocate the resources as in the state illustrated in FIG. 3A and then, to allocate the resources as in the state illustrated in FIG. 3B by the resource allocation system 40 illustrated in FIG. 2 executing operations in accordance with the procedure illustrated in FIG. 4. The operations illustrated in FIG. 4 will be described below.

The resource request receiving unit 41 in the resource allocation system 40 receives a resource allocation request from the resource request unit 50 in Step S11 and provides instructions to the VM management unit 42 and the resource dispensing control unit 43.

The resource dispensing control unit 43 extracts allocatable resources in response to the resource allocation request received this time from among the physical resources 10-1 to 10-4 in Step S12.

Also, the resource dispensing control unit 43 selects more appropriate resources from among the allocatable resources in Step S13. In a case in which occurrence of a failure is taken into consideration, for example, it is desirable to mount the working systems ACT and the standby systems SBY on different pieces of hardware. Thus, in a case in which the physical CPU cores 11 to be allocated to the virtual CPU cores 12 of the working systems ACT are selected from the server 31, for example, the physical CPU cores 11 to be allocated to the virtual CPU cores 12 of the standby systems SBY are selected from among the other servers 32 to 34. Also, the activation core 11B is always selected when the respective virtual machines are activated in the embodiment.

In Step S14, the resource dispensing control unit 43 updates a management table to reflect content in Steps S11 to S13. The management table includes, for example, a redundant configuration management table TB1 and a resource management table TB2, which will be described later.

The VM management unit 42 follows the content of the management table and activates new virtual machines for the working systems ACT and the standby systems SBY in Step S15. The activation core 11B is allocated to the virtual CPU cores 12 of the respective virtual machines activated here in the aforementioned management table. Thus, the respective virtual machines of the virtual network functions 20 and 20B are activated in Step S15 in the resource allocated state as illustrated in FIG. 3A, for example.

In Step S16, the VM information acquisition unit 42a of the VM management unit 42 respectively checks the activated states of the respective virtual machines activated in Step S15. In other words, the virtual machines activated as the working systems ACT and the virtual machines activated as the standby systems SBY are distinguished from each other. Also, the resource operation instruction unit 42b provides an instruction to the resource dispensing control unit 43 to change the resource allocation to the respective virtual machines by reflecting the result in Step S16.

The resource dispensing control unit 43 follows the instruction from the resource operation instruction unit 42b and extracts resources allocatable to the corresponding virtual machines from among the physical resources 10-1 to 10-4 in Step S17.

Also, the resource dispensing control unit 43 selects more appropriate resources from among the allocatable resources in Step S18. In a case in which occurrence of a failure is taken into consideration, for example, it is desirable to mount the working systems ACT and the standby systems SBY on different pieces of hardware. Thus, in a case in which the physical CPU cores 11 to be allocated to the virtual CPU cores 12 of the working systems ACT are selected from the server 31, for example, the physical CPU cores 11 to be allocated to the virtual CPU cores 12 of the standby systems SBY are selected from among the other servers 32 to 34.

In addition, selection is made such that the occupied cores 11-X are allocated to the virtual CPU cores 12 of the working systems ACT and the shared cores 11-Y are allocated to the virtual CPU cores 12 of the standby systems SBY in the embodiment. In a case in which the occupied cores 11-X are allocated, the occupied cores 11-X and the virtual CPU cores 12 are linked in one-to-one correspondence using the CPU pinning method, for example. Note that the resource allocations of the physical CPU cores 11 are actually performed and then conditions may be changed such that the allocated resources function as the occupied cores 11-X or the shared cores 11-Y, for example.

The resource dispensing control unit 43 updates the management table in Step S19 such that content in Steps S15 to S18 is reflected. Also, the VM management unit 42 follows the content of the management table updated in Step S19 and updates content described relating to the corresponding virtual machines in the virtual machine setting file 14 in Step S20. Further, the virtual machine control unit 43c in the resource dispensing control unit 43 follows the instruction from the VM management unit 42 and reactivates the corresponding virtual machines (VM) in Step S21. Note that it is possible to edit the content of the virtual machine setting file 14 using a "virsh edit" command in a case of the environment using Kernel-based virtual machines (KVM), for example.

The resource request receiving unit 41 in the resource allocation system 40 provides a notification of a resource dispensing response in response to the resource allocation request received in Step S11 to the resource request unit 50 in Step S22.

Thus, the resource allocation system 40 can perform control such that the service providing system is configured in the resource allocated state as illustrated in FIG. 3B through the resource allocated state as illustrated in FIG. 3A.

Operation Example-2 of Resource Allocation

Figure 5A:
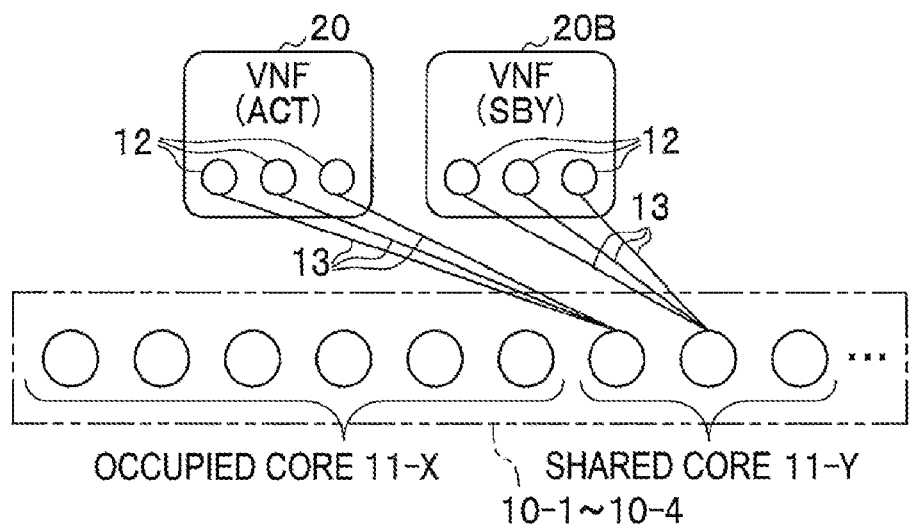
FIG. 5A is a block diagram illustrating an example of an allocated state of the virtual cores and the physical cores that configure the respective virtual machines when the virtual machines are activated.
Figure 5B:
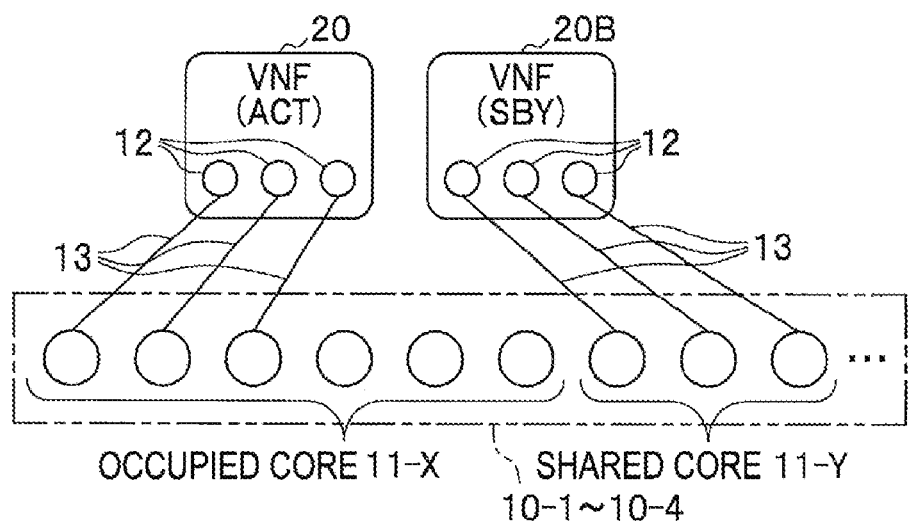
FIG. 5B is a block diagram illustrating an example of an allocated state of the virtual cores and the physical cores that configure the respective virtual machines after the allocation is changed.

FIGS. 5A and 5B illustrates an example of a state in which virtual cores and physical cores that configure the respective virtual machines are allocated. FIG. 5A represents an allocated state when the virtual machines are activated, and FIG. 5B represents a state after the allocation is changed. In this operation example, the resource dispensing control unit 43 functions as an initial resource allocation unit configured to select shared cores that a plurality of virtual machines can commonly use, from among hardware computer resources. The resource allocation change unit functions as a resource allocation change unit that changes allocation of computer resources for the virtual machines of the working systems ACT and the virtual machines of the standby systems SBY.

In the configuration illustrated in FIG. 5A, only the shared cores 11-Y from among the physical CPU cores 11 on the physical resources 10-1 to 10-4 are allocated to the respective virtual CPU cores 12 of the virtual network functions 20 and 20B that implement the same function. The shared cores 11-Y can be allocated such that the plurality of virtual machines can share the shared cores 11-Y, and thus the respective shared cores 11-Y are associated with the plurality of virtual CPU cores 12 at the same time through the link 13 in the configuration in FIG. 5A.

Note that the same shared cores 11-Y may be allocated to the virtual CPU cores 12 of the working systems ACT and the virtual CPU cores 12 of the standby systems SBY that implement the same function at the same time, or mutually different shared cores 11-Y may be allocated to the virtual CPU cores 12 of the working systems ACT and the standby systems SBY.

In a case in which the configuration illustrated in FIG. 5A is employed when new virtual machines are activated, only the shared cores 11-Y are allocated as resources to be used by the respective virtual machines, and it is thus possible to activate the virtual machines effectively using the limited physical resources. Thus, it is possible to activate more virtual machines at the same time without increasing the physical resources due to the increased utilization efficiency of the physical resources.

On the other hand, the plurality of occupied cores 11-X on the physical resources 10-1 to 10-4 are allocated to the virtual CPU cores 12 of the virtual network function 20, and these are associated with each other through the link 13 in the configuration illustrated in FIG. 5B. Also, a plurality of shared cores 11-Y on the physical resources 10-1 to 10-4 are allocated to the virtual CPU cores 12 in the virtual network function 20B, and these are associated with each other through the link 13.

The configuration illustrated in FIG. 5B is equivalent to the configuration illustrated in FIG. 1A. In other words, the virtual machines in the virtual network functions 20 of the working systems ACT can occupy the occupied cores 11-X allocated to the virtual CPU cores 12 of the virtual machines themselves, and thus it is possible to secure sufficient resources for ensuring necessary performance in the configuration illustrated in FIG. 5B. In addition, the shared cores 11-Y allocated to the virtual CPU cores 12 of the virtual machines in the virtual network function 20B of the standby system SBY can also be allocated to and share by other virtual machines at the same time, and thus it is possible to increase the utilization efficiency of the physical resources.

However, the number of virtual network functions VNF1 to VNF6 illustrated in FIG. 1A, for example, increases or decreases with a change in situation in an actual system. Also, the working systems ACT and the standby systems SBY are switched with occurrence of a failure, and it becomes necessary to prepare new working systems ACT and standby systems SBY. Thus, fixed allocation of the resources as in the configuration illustrated in FIG. 5B is not possible from the beginning. Also, there is a probability that necessary performance cannot be obtained due to allocation of the shared resources in a case in which the standby systems SBY of the virtual network functions VNF are switched to the working systems ACT.

Thus, the resources are allocated such that the configuration as illustrated in FIG. 5A is obtained when the respective virtual machines are activated in the embodiment. Then, the resource allocation is changed from the state illustrated in FIG. 5A and is switched to the state illustrated in FIG. 5B. In other words, control is performed as described below.

Figure 6:
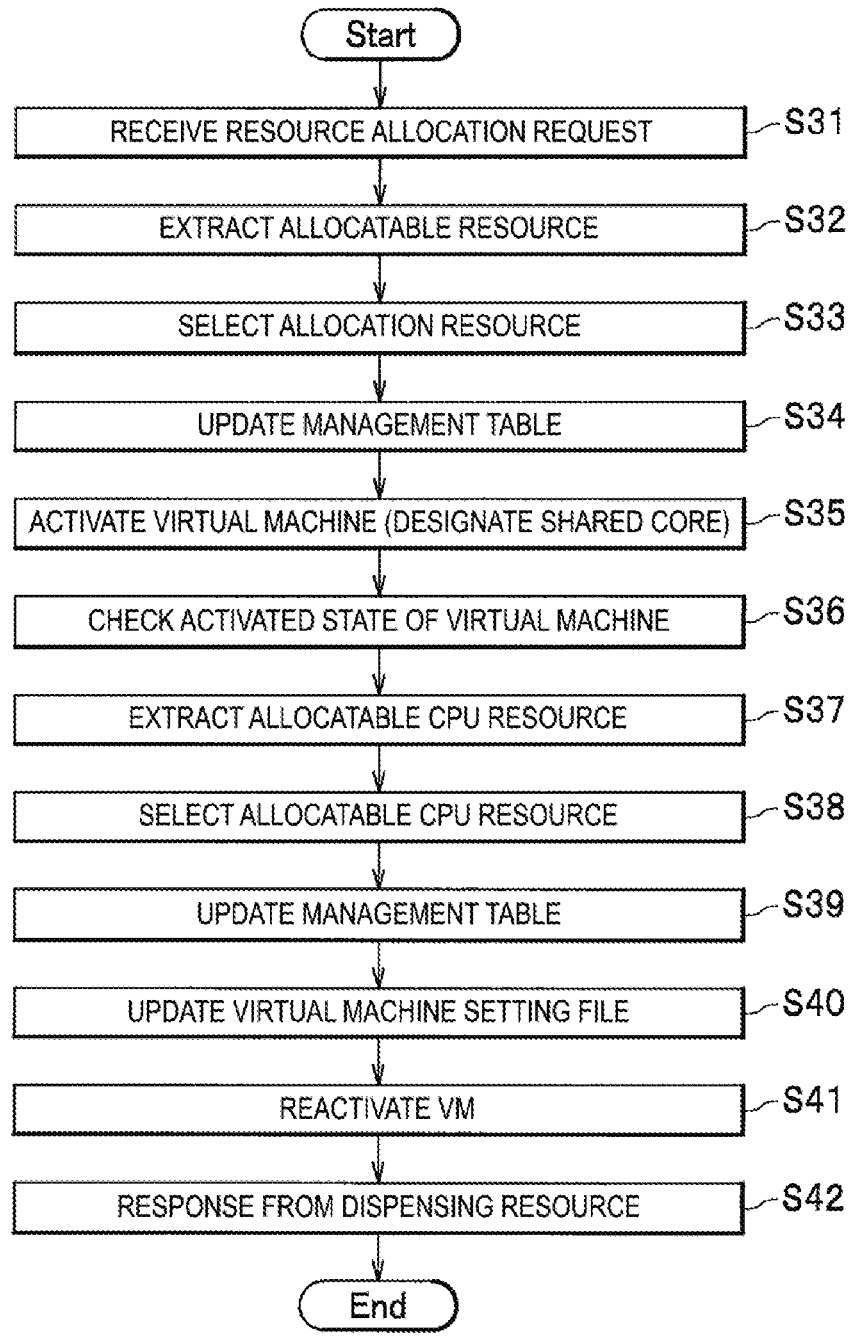
FIG. 6 is a flowchart illustrating an example of operations for implementing resource allocation.

An operation example for implementing the resource allocation as illustrated in FIGS. 5A and 5B is illustrated in FIG. 6. In other words, it is possible to allocate the resources as in the state illustrated in FIG. 5A and then, to allocate the resources as in the state illustrated in FIG. 5B by the resource allocation system 40 illustrated in FIG. 2 executing the operations in accordance with the procedure illustrated in FIG. 6. The operations illustrated in FIG. 6 will be described below.

The resource request receiving unit 41 in the resource allocation system 40 receives a resource allocation request from the resource request unit 50 in Step S31 and provides instructions to the VM management unit 42 and the resource dispensing control unit 43.

The resource dispensing control unit 43 extracts resources allocatable in response to the resource allocation request received this time from among the physical resources 10-1 to 10-4 in Step S32.

Also, the resource dispensing control unit 43 selects more appropriate resources from among the allocatable resources in Step S33. In a case in which occurrence of a failure is taken into consideration, for example, it is desirable to mount the working systems ACT and the standby systems SBY on different pieces of hardware. Thus, in a case in which the physical CPU cores 11 to be allocated to the virtual CPU cores 12 of the working systems ACT are selected from the server 31, for example, the physical CPU cores 11 to be allocated to the virtual CPU cores 12 of the standby systems SBY are selected from among the other servers 32 to 34. In a case in which the operations in FIG. 6 are performed, the shared cores 11-Y are always selected for both the working systems ACT and the standby systems SBY when the respective virtual machines are activated.

In Step S34, the resource dispensing control unit 43 updates the management table to reflect content in Steps S31 to S33. The management table includes, for example, a redundant configuration management table TB1 and a resource management table TB2, which will be described later The VM management unit 42 follows the content of the management table and respectively activates new virtual machines for the working systems ACT and the standby systems in Step S35. The shared cores 11-Y are allocated to the virtual CPU cores 12 of the respective virtual machines activated here in the aforementioned management table. Thus, the respective virtual machines of the virtual network functions 20 and 20B are activated in the resource allocated state as illustrated in FIG. 5A, for example, in Step S35.

In Step 36, The VM information acquisition unit 42a of the VM management unit 42 checks the activated states of the respective virtual machines activated in Step S35. In other words, the virtual machines activated as the working systems ACT and the virtual machines activated as the standby systems SBY are distinguished from each other. Also, the resource operation instruction unit 42b provides an instruction to the resource dispensing control unit 43 such that the resource allocation to the respective virtual machines is changed by reflecting the result in Step S36.

The resource dispensing control unit 43 follows the instruction from the resource operation instruction unit 42b and extracts resources allocatable to the corresponding virtual machines from the physical resources 10-1 to 10-4 in Step S37.

Also, the resource dispensing control unit 43 selects more appropriate resources from the allocatable resources in Step S38. In a case in which occurrence of a failure is taken into consideration, for example, it is desirable to mount the working systems ACT and the standby systems SBY on different pieces of hardware. Thus, in a case in which the physical CPU cores 11 to be allocated to the virtual CPU cores 12 of the working systems ACT are selected from the server 31, for example, the physical CPU cores 11 to be allocated to the virtual CPU cores 12 of the standby systems SBY are selected from among the other servers 32 to 34.

In the case in which the operations in FIG. 6 are performed, selection is made such that the occupied cores 11-X are allocated to the virtual CPU cores 12 of the working systems ACT and the shared cores 11-Y are allocated to the virtual CPU cores 12 of the standby systems SBY In a case in which the occupied cores 11-X are allocated, the occupied cores 11-X and the virtual CPU cores 12 are linked in one-to-one correspondence using the CPU pinning method, for example. Note that the resource allocations of the physical CPU cores 11 are actually performed and then conditions may be changed such that the allocated resources function as the occupied cores 11-X or the shared cores 11-Y, for example.

The resource dispensing control unit 43 updates the management table such that the content in Steps S35 to S38 is reflected in Step S39. Also, the VM management unit 42 follows the content of the management table updated in Step S39 and updates description content of the corresponding virtual machines in the virtual machine setting file 14 in Step S40. Further, the virtual machine control unit 43c in the resource dispensing control unit 43 follows the instruction from the VM management unit 42 and reactivates the corresponding virtual machines (VM) in Step S41.

The resource request receiving unit 41 in the resource allocation system 40 provides a notification of a resource dispensing response to the resource allocation request received in Step S31 to the resource request unit 50 in Step S42.

Thus, the resource allocation system 40 can perform control such that the service providing system is configured in the resource allocated state as illustrated in FIG. 5B through the resource allocated state as illustrated in FIG. 5A.

Operation Example-3 of Resource Allocation

Figure 7:
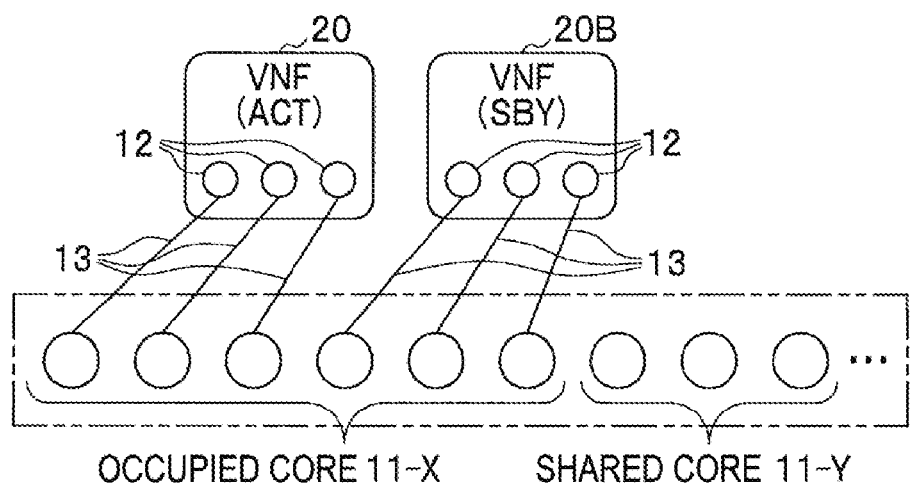
FIG. 7 is a block diagram illustrating an example of an allocated state of the virtual cores and the physical cores that configure the respective virtual machines when the virtual machines are activated.

FIG. 7 illustrates an example of a state in which virtual cores and physical cores configuring the respective virtual machines are allocated. FIG. 7 represents an allocation state when the virtual machines are activated. Note that a state after the allocation is changed is similar to the content in FIG. 5B, which has already been described. In this operation example, the resource dispensing control unit 43 functions as an initial resource allocation unit that selects occupied cores that are occupied or executed with priority by a single virtual machine from among a plurality of hardware computer resources and allocates the occupied cores to the virtual machines in the initial state. Furthermore, the resource dispensing control unit 43 functions as a resource allocation change unit that completes the allocation operation without changing the allocation of the computer resources to the virtual machines of the working systems ACT. The resource dispensing control unit 43 functions as a resource allocation change unit that changes the allocation of the computer resources to the virtual machines of the standby systems SBY.

In the configuration illustrated in FIG. 7, only the occupied cores 11-X from among the physical CPU cores 11 on the physical resources 10-1 to 10-4 are allocated to the respective virtual CPU cores 12 of the virtual network functions 20 and 20B that implement the same function. The occupied cores 11-X are allocated such that only a single virtual machine can use the occupied cores 11-X, and thus the plurality of independent occupied cores 11-X are associated with the plurality of virtual CPU cores 12 in one-to-one correspondence through the link 13 in the configuration in FIG. 7.

Note that inconsideration of occurrence of a failure, it is desirable to select the occupied cores 11-X from among mutually independent different pieces of hardware, for example, mutually different servers and allocate the selected occupied cores 11-X to the respective virtual CPU cores 12 of the working systems ACT and the virtual CPU cores 12 of the standby systems SBY that implement the same function.

Ina case in which the configuration illustrated in FIG. 7 is employed when new virtual machines are activated, only the occupied cores 11-X are allocated as resources to be used by the respective virtual machines, and it is thus possible to shorten a time required until last resource allocation is completed. In other words, the virtual machines of the working systems ACT can directly start the service without changing the resource allocation from the state illustrated in FIG. 7, and thus it is possible to curb a delay of processing associated with a change in resource allocation.

The number of virtual network functions VNF1 to VNF6 illustrated in FIG. 1A, for example, increases or decreases with a change in situation in an actual system. Also, the working systems ACT and the standby systems SBY are switched with occurrence of a failure, and it becomes necessary to prepare new working systems ACT and standby systems SBY. Thus, fixed allocation of the resources as in the configuration illustrated in FIG. 7 is not possible from the beginning. In addition, the virtual machines of the standby systems SBY occupy the resources of the occupied cores 11-X similarly to the working systems ACT if no change is added to the configuration illustrated in FIG. 7, and thus the utilization efficiency of the physical resources is not increased.

Thus, the resources are allocated such that the configuration as illustrated in FIG. 7 is obtained when the respective virtual machines are activated in the embodiment. Then, the resource allocation is changed from the state illustrated in FIG. 7 and is switched to the state illustrated in FIG. 5B. In other words, control is performed as described below.

Figure 8:
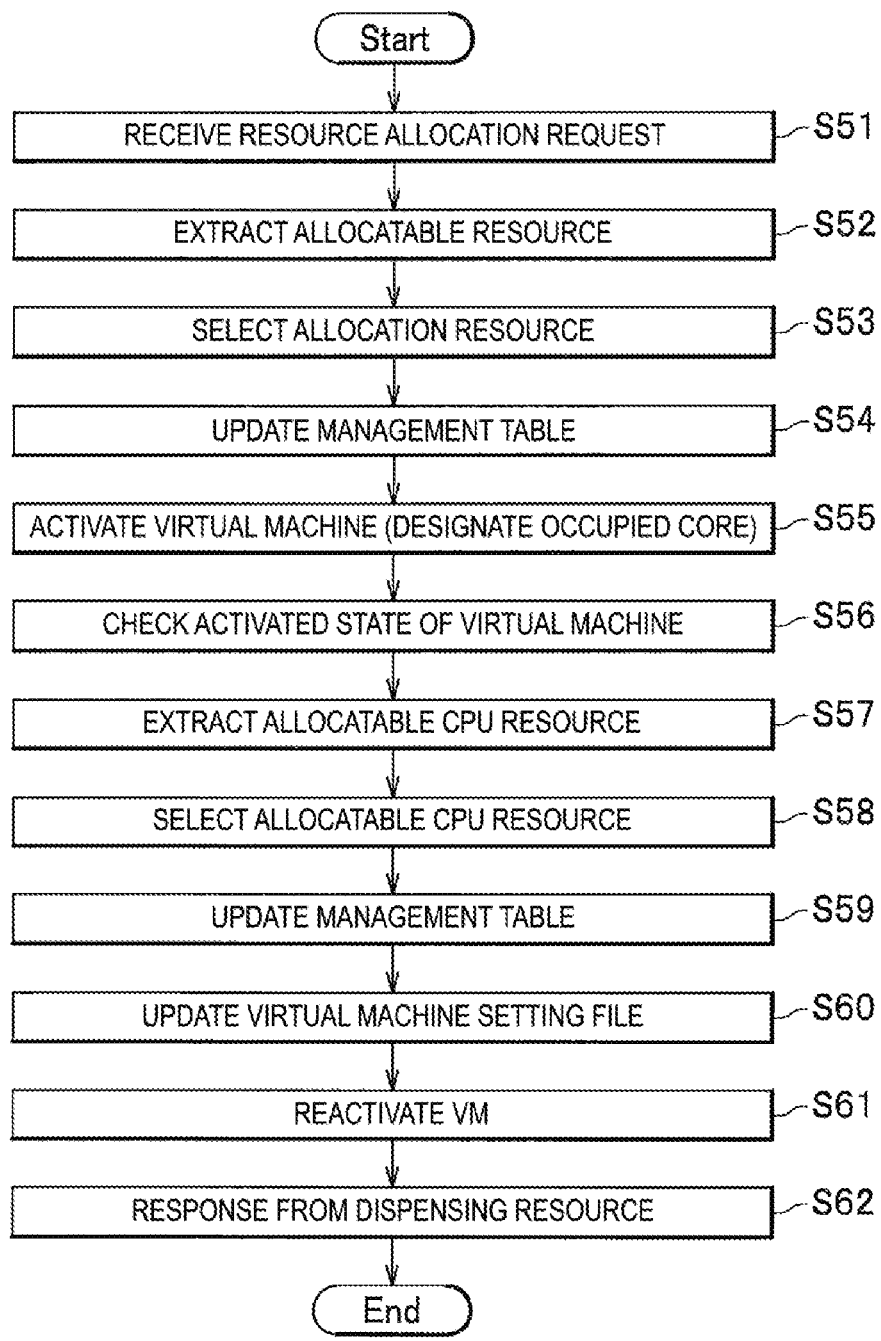
FIG. 8 is a flowchart illustrating an example of operations for implementing resource allocation as illustrated in FIG. 7 and FIG. 5B.

An operation example to implement the resource allocation as illustrated in FIGS. 7 and 5B is illustrated in FIG. 8. In other words, it is possible to allocate the resources as in the state illustrated in FIG. 7 and then, to change the resource allocation as in the state illustrated in FIG. 5B, for example, by the resource allocation system 40 illustrated in FIG. 2 executing the operations in accordance with the procedure illustrated in FIG. 8. The operations illustrated in FIG. 8 will be described below.

The resource request receiving unit 41 in the resource allocation system 40 receives a resource allocation request from the resource request unit 50 in Step S51 and provides instructions to the VM management unit 42 and the resource dispensing control unit 43.

The resource dispensing control unit 43 extracts resources that can be allocated in response to the resource allocation request received this time from among the physical resources 10-1 to 10-4 in Step S52.

Also, the resource dispensing control unit 43 selects more appropriate resources from among the allocatable resources in Step S53. In a case in which occurrence of a failure is taken into consideration, for example, it is desirable to mount the working systems ACT and the standby systems SBY on different pieces of hardware. Thus, in a case in which the physical CPU cores 11 to be allocated to the virtual CPU cores 12 of the working systems ACT are selected from the server 31, for example, the physical CPU cores 11 to be allocated to the virtual CPU cores 12 of the standby systems SBY are selected from among the other servers 32 to 34. Also, in a case in which the operations in FIG. 8 are performed, the occupied cores 11-X are always selected for both the working systems ACT and the standby systems SBY when the respective virtual machines are activated.

In Step S54, the resource dispensing control unit 43 updates the management table by reflecting the content in Steps S51 to S53. The management table includes, for example, a redundant configuration management table TB1 and a resource management table TB2, which will be described later.

The VM management unit 42 follows the content in the management table and respectively activates new virtual machines for the working systems ACT and the standby systems SBY in Step S55. The occupied cores 11-X are allocated to the virtual CPU cores 12 of the respective virtual machines activated here in the aforementioned management table. Thus, the respective virtual machines of the virtual network functions 20 and 20B are activated in Step S55 in the resource allocated state as in FIG. 7, for example.

In Step S56, the VM information acquisition unit 42a of the VM management unit 42 checks the activated states of the respective virtual machines activated in Step S55. In other words, the virtual machines activated as the working systems ACT and the virtual machines activated as the standby systems SBY are distinguished from each other. Also, the resource operation instruction unit 42b provides an instruction to the resource dispensing control unit 43 in Step S56 such that the resource allocation to the respective virtual machines is changed by reflecting the result.

The resource dispensing control unit 43 follows the instruction from the resource operation instruction unit 42b and extracts resources that can be allocated to the corresponding virtual machines from among the physical resources 10-1 to 10-4 in Step S57.

In addition, the resource dispensing control unit 43 selects more appropriate resources from among the allocatable resources in Step S58. In a case in which occurrence of a failure is taken into consideration, for example, it is desirable to mount the working systems ACT and the standby systems SBY on different pieces of hardware. Thus, in a case in which the physical CPU cores 11 to be allocated to the virtual CPU cores 12 of the working systems ACT are selected from the server 31, for example, the physical CPU cores 11 to be allocated to the virtual CPU cores 12 of the standby systems SBY are selected from among the other servers 32 to 34.

Also, in a case in which the operations in FIG. 8 are performed, selection is made such that the occupied cores 11-X are allocated to the virtual CPU cores 12 of the working systems ACT and the shared cores 11-Y are allocated to the virtual CPU cores 12 of the standby systems SBY. In a case in which the occupied cores 11-X are allocated, the occupied cores 11-X and the virtual CPU cores 12 are linked in one-to-one correspondence using the CPU pinning method, for example. Note that the resource allocations of the physical CPU cores 11 are actually performed and then conditions may be changed such that the allocated resources function as the occupied cores 11-X or the shared cores 11-Y, for example.

In practice, the occupied cores 11-X are allocated to the virtual machines of the working systems ACT in a state in which the virtual machines are initially activated, for example, the state illustrated in FIG. 7, and thus it is not necessary to change this. In other words, selection for changing the resource allocation is performed only for the standby systems SBY to which the occupied cores 11-X are allocated in the state at the time of activation in Step S58.

In Step S59, the resource dispensing control unit 43 updates the management table by reflecting the content in Steps S55 to S58. Also, the VM management unit 42 follows the content of the management table updated in S59 and updates the description content of the corresponding virtual machines in the virtual machine setting file 14 in Step S60. Further, the virtual machine control unit 43c in the resource dispensing control unit 43 follows the instruction from the VM management unit 42 and reactivates the corresponding virtual machines (VM) in Step S61.

The resource request receiving unit 41 in the resource allocation system 40 provides a notification of a resource dispensing response to the resource allocation request received in Step S51 to the resource request unit 50 in Step S62.

Thus, the resource allocation system 40 can perform control such that the service providing system is configured in the resource allocated state as illustrated in FIG. 5B through the resource allocated state as illustrated in FIG. 7.

Description Examples in Virtual Machine Setting File 14

FIGS. 9A, 9B, and 9C respectively illustrate descriptive examples of content in the virtual machine setting file 14 when the virtual machines are initially activated.

The content in the virtual machine setting file 14A illustrated in FIG. 9A is a description example for implementing resource allocation as illustrated in FIG. 3A, for example. In other words, the description example in FIG. 9A means that a 0-th physical CPU core 11 prepared as the activation core 11B is allocated to the virtual CPU cores 12 of the respective virtual machines represented as 0-th, first, and second "vcpu" in the item <cputune> in the virtual machine setting file 14A.

Also, content in the virtual machine setting file 14B illustrated in FIG. 9B is a description example for implementing resource allocation as illustrated in FIG. 5A, for example. In other words, the description example of FIG. 9B means that a seventh physical CPU core 11 corresponding to the shared core 11-Y is allocated to the virtual CPU cores 12 of the respective virtual machines represented as 0-th, first, and second "vcpu" in the item <cputune> item in the virtual machine setting file 14B.

Also, the content in the virtual machine setting file 14C illustrated in FIG. 9C is a description example for implementing the resource allocation as illustrated in FIG. 7, for example. In other words, the description example of FIG. 9C means that the first, second, and third physical CPU cores 11 corresponding to the occupied cores 11-X are allocated to the virtual CPU cores 12 of the respective virtual machines represented as 0-th, first, and second "vcpu" in the item <cputune> in the virtual machine setting file 14C.

On the other hand, FIGS. 10A and 10B illustrates description examples of content in the virtual machine setting file 14 after the allocation is changed.

The description example in the virtual machine setting file 14D illustrated in FIG. 10A represents content of resource allocation to the virtual machines of the working systems ACT after resource allocation is changed as in the allocated state illustrated in FIG. 3B, for example.

In other words, the description example in FIG. 10A means that first, second, and third independent physical CPU cores 11 corresponding to the occupied cores 11-X are individually allocated to the virtual CPU cores 12 of the respective virtual machines represented as 0-th, first, and second "vcpu" in the item <cputune> in the virtual machine setting file 14D.

The description example in the virtual machine setting file 14E illustrated in FIG. 10B represents content of resource allocation to the virtual machines of the standby systems SBY after the resource allocation is changed as in the allocated state illustrated in FIG. 3B, for example.

In other words, the description example in FIG. 10B means that seventh, eighth, and ninth physical CPU cores 11 corresponding to the shared cores 11-Y are allocated to the virtual CPU cores 12 of the respective virtual machines represented as 0-th, first, and second "vcpu' in the item <cputune> in the virtual machine setting file 14E. Note that the same single shared core 11-Y may be allocated to a plurality or all of the virtual CPU cores 12 of the standby systems SBY. In other words, it is possible to allocate virtual resources exceeding capacity of actual physical resources to the virtual machines, that is, to implement over-committing.

Specific Example of Detailed Resource Allocation Operation

Figure 11:
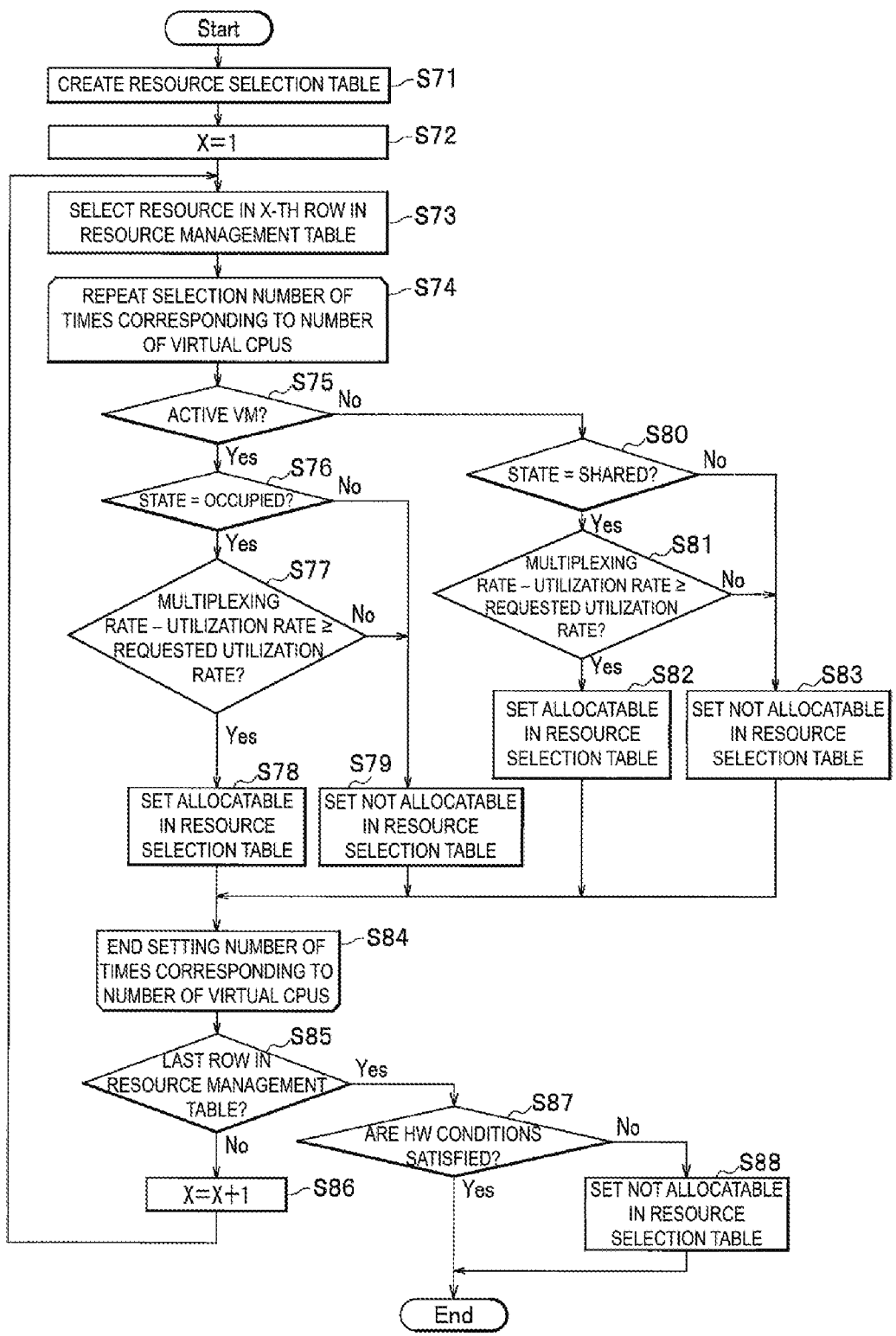
FIG. 11 is a flowchart illustrating an example of operations performed in a case in which resources are allocated to the respective virtual machines in accordance with a resource management table.

FIG. 11 illustrates an operation example in a case in which resources are allocated to the respective virtual machines in accordance with a resource management table. In other words, FIG. 11 illustrates details of processing corresponding to Steps S16 to S18 in FIG. 4, Steps S36 to S38 in FIG. 6, and Steps S56 to S58 in FIG. 8. Thus, it is possible to change the resource allocation to a desired state as illustrated in FIGS. 3B and 5B, for example, by the resource allocation system 40 executing the operations illustrated in FIG. 11. The operations in FIG. 11 will be described below.

The resource dispensing control unit 43 creates a resource selection table in Step S71, initializes a variable X to 1 in Step S72, and then repeatedly executes processing in and after Step S73 in a loop manner.

The resource dispensing control unit 43 selects resources in a row identified with the value of the variable X from a resource management table TB2 as illustrated in FIG. 16 in Step S73. Note that the resource management table TB2 will be described later.

The resource dispensing control unit 43 repeatedly executes processing in Steps S74 to S84 the number of times corresponding to the number of virtual CPU cores 12 that are targets of the processing.

In Step S75, the resource dispensing control unit 43 identifies whether or not allocation destination virtual machines are virtual machines "Active VM" of working systems ACT The processing proceeds to Step S76 if the allocation destinations belong working systems ACT, or the processing proceeds to Step S80 if the allocation destinations belong standby systems SBY.

In Step S76, the resource dispensing control unit 43 identifies whether the physical CPU cores 11 to be allocated are in an "occupied state" and moves on to Step S77 if the physical CPU cores 11 are in the "occupied" state or moves on to Step S79 if the physical CPU cores 11 are not in the "occupied" state.

In Step S77, the resource dispensing control unit 43 identifies whether or not a result obtained by subtracting a"utilization rate" from a "multiplexing rate" is equal to or greater than a "required utilization rate" and moves on to Step S78 in a case in which this condition is satisfied or moves on to Step S79 in a case in which the condition is not satisfied.

In Step S78, the resource dispensing control unit 43 writes information representing "allocatable" at a position of a corresponding row in the resource selection table created in Step S71. Also, in Step S79, the resource dispensing control unit 43 writes information representing "not allocatable" at a position of the corresponding row in the resource selection table.

In Step S80, the resource dispensing control unit 43 identifies whether or not the physical CPU cores 11 to be allocated are in a "shared" state and moves on to Step S81 in a case in which the physical CPU cores 11 are in the "shared" state or moves on to Step S83 in a case in which the physical CPU cores 11 are not in the "shared" state.

In Step S81, the resource dispensing control unit 43 identifies whether or not a result obtained by subtracting a "utilization rate" from a "multiplexing rate" is equal to or greater than a "required utilization rate" and moves on to Step S82 in a case in which this condition is satisfied or moves on to Step S83 in a case in which the condition is not satisfied.

In Step S82, the resource dispensing control unit 43 writes information representing "allocatable" at a position of the corresponding row in the resource selection table. In Step S83, the resource dispensing control unit 43 writes information representing "not allocatable" at a position of the corresponding row in the resource selection table.

In Step S85, the resource dispensing control unit 43 identifies whether or not processing has been completed up to the last row in the resource management table TB2 and moves on to Step S87 in a case in which the processing is completed. If not, the process proceeds to Step S86, in which the value of the variable X is incremented, and the processing returns to Step S73 to repeat the aforementioned processing.

In Step S87, the resource dispensing control unit 43 identifies whether or not the result of the aforementioned processing satisfies conditions of hardware (HW) and directly ends the processing in FIG. 11 in a case in which the conditions are satisfied. If the conditions of hardware are not satisfied, the resource dispensing control unit 43 moves on to Step S88 and writes information of "not allocatable" in the resource selection table. Here, satisfying the conditions of hardware means that HW allocation conditions such as an "anti-affinity" attribute are satisfied. The anti-affinity attribute is for designating that specific virtual machines are required to be executed always in different physical servers.

Failover Operation when Failure Occurs

Figure 12A:
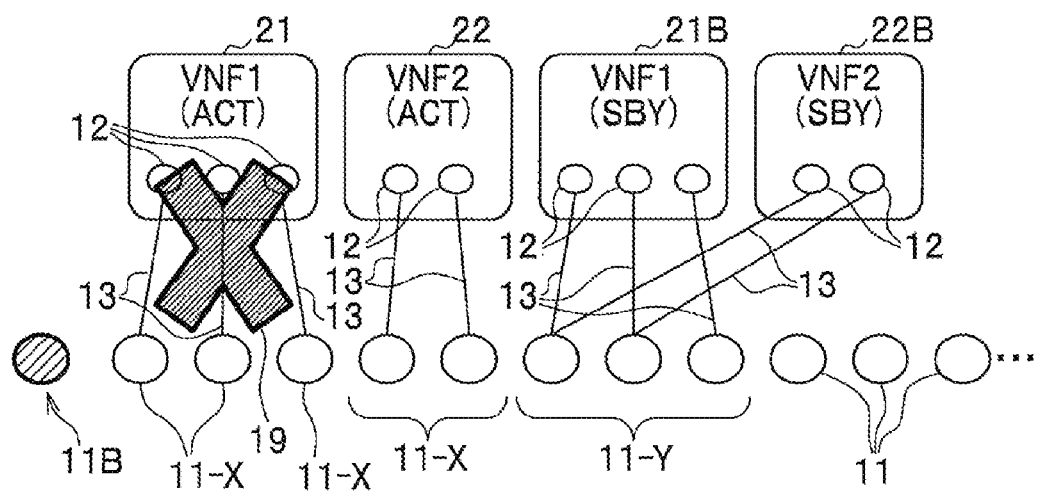
FIG. 12A is a block diagram representing an example of a system configuration and a resource allocated state immediately after a failure occurs.
Figure 12B:
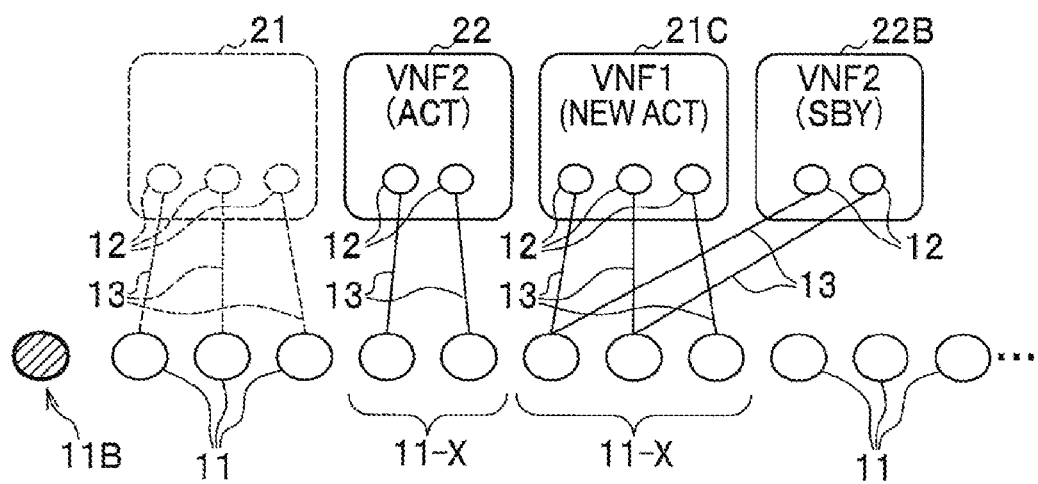
FIG. 12B is a block diagram representing an example of a system configuration and a resource allocated state in the process of failover
Figure 12C:
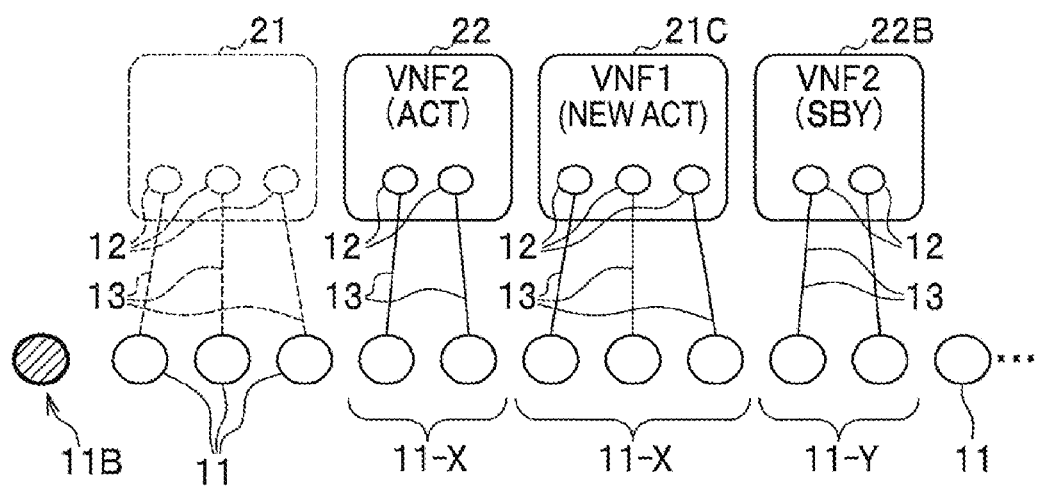
FIG. 12C is a block diagram representing an example of a system configuration and a resource allocated state after a failover.

FIGS. 12A to 12C illustrates an example of a system configuration and a resource allocated state. FIG. 12A represents a state immediately after a failure occurs in a virtual network function 21 of a working system ACT, FIG. 12B represents a state in the course of the failover, and FIG. 12C represents a state after the failover is done.

There may be a case in which a failure 19 occurs in the virtual network function 21 of the working system ACT as in FIG. 12A in a situation in which the virtual network functions 21 and 22 are operating as in the configuration illustrated in FIG. 1A, for example. In this system, a virtual network function 21B of a standby system SBY that forms a pair with the virtual network function 21 of the working system ACT is present as a redundant configuration, and thus switching the virtual network function from the working system ACT to the standby system SBY, that is, performing failover, enables this system to directly continue to provide a service even when a failure occurs.

However, the shared cores 11-Y are allocated to the virtual CPU cores 12 of the virtual network function 21B in the configuration in FIG. 12A, thus capacity of available resources will become insufficient if no change is made, and necessary performance is not obtained after the failover. Thus, it is necessary to change resource allocation at the time of the failover.

If the failover and the change in resource allocation are performed from the state in FIG. 12A, then through the state in FIG. 12B, the state as illustrated in FIG. 12C is obtained, for example. In other words, instead of the virtual network function 21 that has stopped its function, a new virtual network function 21C of a working system ACT is prepared in the configuration in FIG. 12B. Also, the virtual network function 21C is a working system ACT, and thus the occupied cores 11-X are allocated as hardware resources to the virtual CPU cores 12. In addition, another network function 22B still shares the same occupied cores 11-X in the state in FIG. 12B. Thus, the resource allocation is changed such that the virtual network function 22B uses other shared cores 11-Y as illustrated in FIG. 12C, for example.

In practice, operations as in the respective steps Sf1 to Sf4 described below are executed in order to switch the state in FIG. 12A to the state in FIG. 12C.

Sf1: Operation of Detecting Failure 19

The monitoring function unit 44 detects occurrence of a failure, or application software of a corresponding virtual network function VNF1 detects occurrence of a failure, and then a notification of the occurrence is provided to the VM management unit 42.

Sf2: Failover Operation

The virtual machines are switched from the standby system SBY to the working system ACT through a function of the application software of the virtual network function VNF1 of the standby system SBY. There is also a probability that this operation occurs prior to the aforementioned operation of detecting a failure in Step Sf1.

Sf3: Operations of Checking Virtual Machine Activated State and Re-Allocating CPU Resources Sf31: From a redundant configuration management table TB 1 (illustrated in FIG. 15), the VM management unit 42 identifies the other virtual machine forming a pair of a redundant configuration with a virtual machine in which a failure 19 has occurred, checks an activated state thereof, and further checks a shared status of CPU resources from the resource management table TB2. In a case in which the "state" is "shared' in the resource management table TB2, for example, the VM management unit 42 can check that a failure has occurred in the working system ACT as in FIG. 12A. For example, in the case of FIG. 12A, the shared cores 11-Y are allocated to the virtual CPU cores 12 of the virtual network function 21B forming a pair with the virtual network function 21 in which the failure has occurred, it is necessary to change the shared cores 11-Y to the occupied cores 11-X. Thus, either the following Step Sf31A or S31B is executed.

Sf31A: The virtual machines of other standby systems SBY sharing the shared cores 11-Y allocated to the virtual machines of the virtual network function 21B that has been switched to the working system ACT are pushed out and excluded from the allocation destination of the shared cores 11-Y. In this manner, the virtual machines of the virtual network function 21B can use the corresponding shared cores 11-Y as new occupied cores 11-X without any change.

Sf31B: Content in definition files of the corresponding virtual machines are updated such that CPU resources are newly dispensed and the physical CPU cores 11 and the virtual CPU cores 12 are fixedly occupied in a one-to-one relationship through the CPU pinning.

Sf32: In a case in which the aforementioned Step Sf31A is executed, it is necessary to return the other virtual machines pushed out from the shared cores 11-Y to a predetermined usable state. Thus, either the following Step Sf32A or Sf32B is executed.

Sf32A: The other corresponding virtual machines are suspended or shut off, CPU resources are newly dispensed for the virtual machines of the standby system SBY, and content in definition files of the virtual machines is updated.

Sf32B: The other corresponding virtual machines are once deleted, and then the virtual machines of the corresponding standby systems SBY are activated again.

Sf4: Operations of Activating and Incorporating New Virtual Machines of Standby Systems SBY The VM management unit 42 provides an instruction for activating new virtual machines of standby systems SBY to the resource dispensing control unit 43.

On the other hand, in a case in which a failure occurs in a virtual machine of a standby system SBY, it is not necessary to perform failover, and only the aforementioned Steps Sf1, Sf3, and Sf4 are thus executed. In addition, the following processing is performed in Step Sf3 in that case.

From the redundant configuration management table TB1, the VM management unit 42 identifies the other virtual machine forming a pair of a redundant configuration with a virtual machine in which the failure 19 has occurred, checks an activated state thereof, and further checks a shared status of the CPU resources from the resource management table TB2. In a case in which the "state" is "occupied" in the resource management table TB2, for example, the VM management unit 42 can check that a failure has occurred in the standby system SBY. Resource re-allocation is not performed in that case.

Specific Operation Example-1 for Failover

Figure 13:
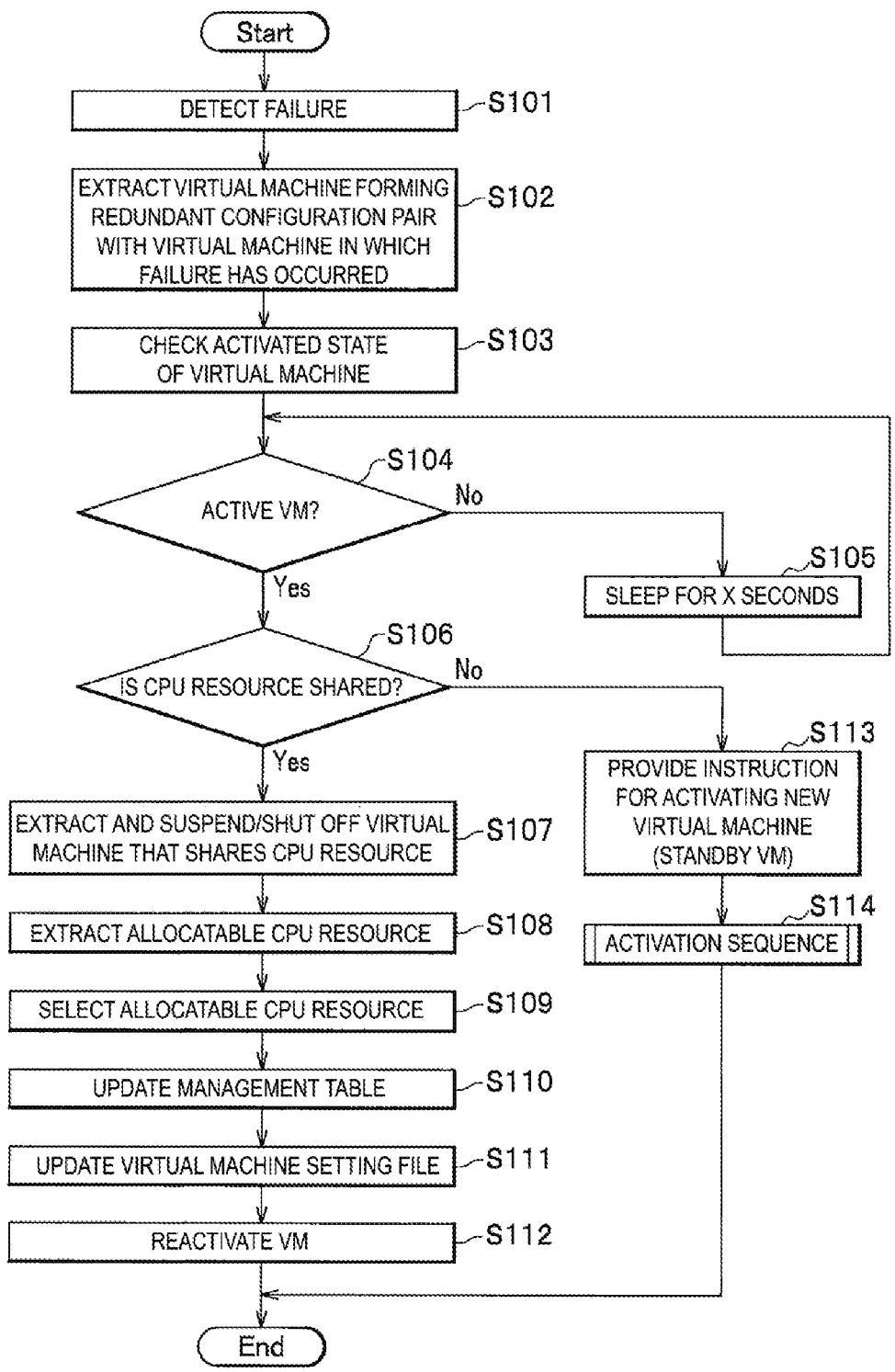
FIG. 13 is a flowchart illustrating an example-1 of operations for a failover when a failure occurs.

FIG. 13 illustrates an operation example-1 for failover when a failure occurs. In other words, FIG. 13 illustrates an operation example in a case in which the resource allocation system 40 executes the aforementioned Step Sf31A. The operations in FIG. 13 will be described below.

In Step S101, the monitoring function unit 44 detects occurrence of a failure 19. For example, it is possible to detect the failure 19 by monitoring hart beat operating information that is mutually notified between the working system ACT and the standby system SBY at a normal time.

In Step S102, the VM management unit 42 refers to the redundant configuration management table TB1 and extracts information for identifying a virtual machine on a normal side forming a pair of a redundant configuration with the virtual machine in which the failure 19 has occurred. Also, in Step S103 and S104, the VM management unit 42 checks activated state of the normal virtual machine extracted in Step S102. In other words, in Step S104, the VM management unit 42 identifies whether or not the operating state of the corresponding normal virtual machine is an active state (Active VM).

In a case in which the operating state of the corresponding normal virtual machine is not the active state, the processing proceeds from Step S104 to Step S105, and waits through sleep for a specific period of time (X seconds) until an active state is achieved.

In a case in which the operating state of the corresponding normal virtual machine is turned into the active state, then the resource dispensing control unit 43 refers to the content of the resource management table TB2 in Step S106 and identifies whether the "state" of the corresponding resources is "shared". In other words, the resource dispensing control unit 43 identifies whether or not the physical CPU cores 11 allocated to the virtual CPU cores 12 of the corresponding virtual machine are the shared cores 11-Y. The processing proceeds to Step S107 in a case in which the "state" of the corresponding resources is "shared", or the processing proceeds to Step S113 in a case in which the "state" is not "shared".

In Step S107, the VM management unit 42 identifies other virtual machines that share the same physical CPU cores 11 using information of "destination of allocation" in the resource management table TB2, and the other virtual machines are suspended and shut off. In this manner, it is possible to push out other virtual machines from the destinations of allocation of the shared cores 11-Y allocated to the virtual machine that operates as a new working system ACT through the failover, and the shared cores 11-Y can be used as the occupied cores 11-X.

On the other hand, the resource dispensing control unit 43 executes the respective Steps S108 to S112 in order to return the other virtual machines pushed out of the allocation destinations of the shared cores 11-Y through the processing in Step S107 to an ordinary usable state.

In Step S108, the resource extraction/selection unit 43b extracts, as resources, physical CPU cores 11 allocatable to the corresponding virtual machines. Also, in Step S109, the resource extraction/selection unit 43b selects appropriate physical CPU cores 11 to be allocated to the corresponding virtual machines.

In addition, the resource dispensing control unit 43 updates content of the redundant configuration management table TB1 and the resource management table TB2 in Step S110 in order to reflect the selection result in Step S109. Further, the resource dispensing control unit 43 updates content of the virtual machine setting file 14 in Step S111.

In addition, the resource dispensing control unit 43 reactivates the corresponding virtual machines in Step S112 such that the corresponding virtual machines operate in a state in which the content of the virtual machine setting file 14 updated in Step S111 is reflected.

On the other hand, if the virtual machine in which the failure 19 has occurred is a standby system SBY, the virtual machine of the working system ACT forming a pair with the virtual machine in which the failure 19 has occurred can be continuously used without any change from the current status, and thus it is not necessary to perform failover. However, it is necessary to prepare an alternative of the virtual machine of the standby system SBY in which the failure 19 has occurred, for later occurrence of a failure.

Accordingly, the VM management unit 42 provides an instruction for activating anew virtual machine (Standby VM) that can operate as a standby system SBY to the resource dispensing control unit 43 in Step S113. The resource dispensing control unit 43 follows the instruction from the VM management unit 42 and executes a predetermined activation sequence for the new virtual machine that can operate as the standby system SBY in Step S114. For example, operations illustrated in any of FIG. 4, FIG. 6, and FIG. 8 are executed.

Specific Operation Example-2 for Failover

Figure 14:
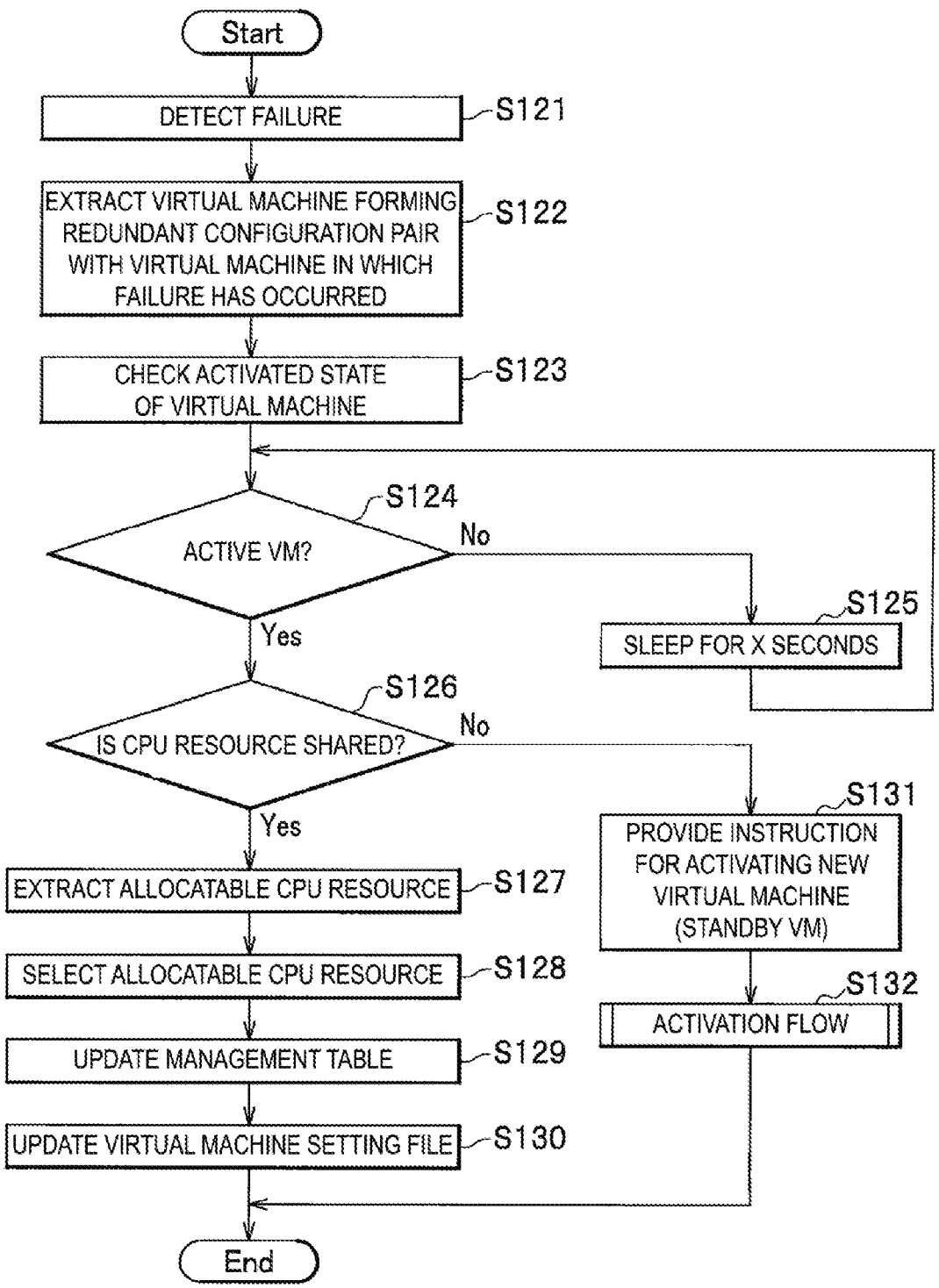
FIG. 14 is a flowchart illustrating an example-2 of operations for a failover when a failure occurs.

FIG. 14 illustrates an operation example-2 for failover when a failure occurs. In other words, FIG. 14 illustrates an operation example in a case in which the resource allocation system 40 executes the aforementioned Step Sf3B. The operations in FIG. 14 will be described below.

In Step S121, the monitoring function unit 44 detects occurrence of a failure 19. For example, it is possible to detect the failure 19 by monitoring hart beat operating information that is mutually notified between the working system ACT and the standby system SBY at a normal time.

In Step S122, the VM management unit 42 refers to the redundant configuration management table TB1 and extracts information for identifying a virtual machine on a normal side forming a pair of a redundant configuration with the virtual machine in which the failure 19 has occurred. In Steps S123 and S124, the VM management unit 42 checks an activated state of the normal virtual machine extracted in Step S122. In other words, the VM management unit 42 checks whether or not the operating state of the corresponding normal virtual machine is an active state (Active VM) in Step S124.

Ina case in which the operating state of the corresponding normal virtual machine is not the active state, the processing proceeds from Step S124 to Step S125 and waits through sleep for a specific period of time (X seconds) until the active state is achieved.

Ina case in which the operating state of the corresponding normal virtual machine is turned into the active state, then the resource dispensing control unit 43 refers to the content of the resource management table TB2 and identifies whether or not the "state" of corresponding resources is "shared" in Step S126. In other words, the resource dispensing control unit 43 identifies whether or not the physical CPU cores 11 allocated to the virtual CPU cores 12 of the corresponding virtual machine are the shared cores 11-Y. The processing proceeds to Step S127 in a case in which the "state" of the corresponding resources is "shared", and the processing proceeds to Step S131 in a case in which the "state" is not "shared".

In Steps S127 to S130, the resource dispensing control unit 43 executes resource allocation for allocating appropriate occupied cores 11-X instead of the shared cores 11-Y to the virtual machine that is caused to operate as a new working system ACT through the failover.

In Step S127, the resource extraction/selection unit 43b extracts, as resources, physical CPU cores 11 allocatable to the corresponding virtual machines. In Step S128, the resource extraction/selection unit 43b selects occupied cores 11-X as appropriate physical CPU cores 11 to be allocated to the corresponding virtual machines.

The resource dispensing control unit 43 updates content of the redundant configuration management table TB1 and the resource management table TB2 such that the selection result in Step S128 is reflected, in Step S129. Further, the resource dispensing control unit 43 updates content of the virtual machine setting file 14 in Step S130.

On the other hand, if the virtual machine in which the failure 19 has occurred is a standby system SBY, the virtual machine of the working system ACT forming a pair with the virtual machine in which the failure 19 has occurred can be continuously used without any change from the current status, and thus it is not necessary to perform failover. However, it is necessary to prepare an alternative of the virtual machine of the standby system SBY in which the failure 19 has occurred, for later occurrence of a failure.

Thus, the VM management unit 42 provides an instruction for activating the new virtual machine (Standby VM) that can operate as a standby system SBY to the resource dispensing control unit 43 in Step S131. The resource dispensing control unit 43 follows the instruction from the VM management unit 42 and executes a predetermined activation sequence for the new virtual machine that can operate as the standby system SBY in Step S132. For example, operations illustrated in any of FIG. 4, FIG. 6, and FIG. 8 are executed.

Configuration Example of Management Table

Figure 15:
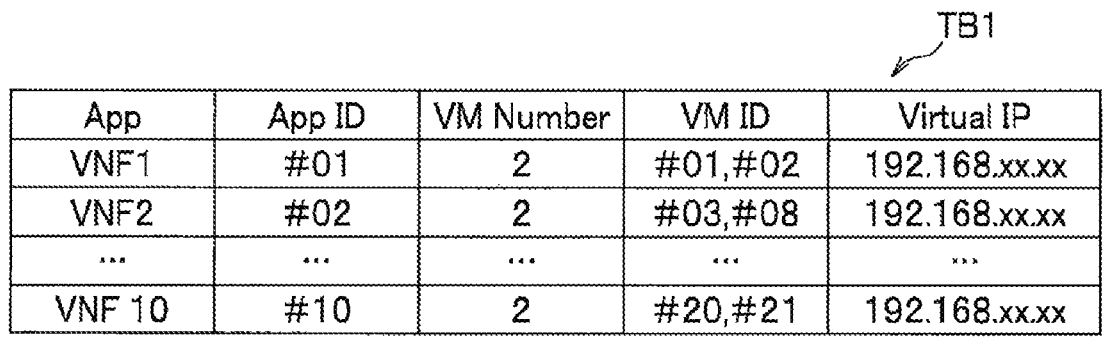
FIG. 15 is a schematic diagram illustrating a configuration example of a redundant configuration management table.

FIG. 15 illustrates a configuration example of the redundant configuration management table TB. The redundant configuration management table TB1 is used to identify the other virtual machine forming a pair of a redundant configuration with a virtual machine in which a failure occurs, when the failure occurs.

The redundant configuration management table TB1 illustrated in FIG. 15 have regions for holding information including an application identifier (App ID), a virtual machine number (VM Number), a virtual machine identifier (VM ID), and a virtual IP address (Virtual IP) for each piece of application software (App) of a virtual network function VNF.

Note that the redundant configuration management table TB1 in FIG. 15 may not include the information of the virtual IP address. In addition, it is possible to recognize the other virtual machine that forms the pair of the redundant configuration by managing IP addresses of all belonging virtual machines instead of the virtual IP addresses, for example.

In the example illustrated in FIG. 15, it is possible to recognize that the first virtual machine and the second virtual machine are allocated as a pair of a redundant configuration from two pieces of information "#01" and "#02" included in the item of the virtual machine identifier for the first virtual network function VNF1, for example. In other words, one of the first virtual machine and the second virtual machine serves as a working system ACT while the other one serves as a standby system SBY in this case.

FIG. 16 illustrates a configuration example of the resource management table TB2. The resource management table TB2 is used to manage allocated statuses of the physical CPU cores 11 to the virtual CPU cores 12 of the respective virtual machines.

The resource management table TB2 illustrated in FIG. 16 has regions for holding respective pieces of information including a hardware identifier (HW Id) indicating each physical resource 10, a core number, a multiplexing rate, a utilization rate, a state, and an allocation destination of each physical CPU core 11.

The multiplexing rate is an index indicating operation capability of each physical CPU core 11 with reference to performance of a physical CPU core 11 included in a certain physical resource 10. Here, a physical CPU core 11 with a hardware identifier of #0 and with a core number of 0 is selected as a reference.

The utilization rate is an index indicating how much of the performance of each physical CPU core 11 indicated by the multiplexing rate has been used.

The state indicates whether or not each physical CPU core 11 has been occupied by any of the virtual machines and whether or not each physical CPU core 11 has been allocated as one for activation. In the example in FIG. 16, one of the physical CPU cores 11 of the respective physical resources 10 has been selected as a dedicated CPU core for activation.

The allocation destination indicates whether each physical CPU core 11 has been allocated to any of the virtual machines. Here, "–" indicating that the physical CPU core 11 has not been allocated, "Host OS", and the respective virtual CPUs of the respective virtual machines are described.

Note that information of the multiplexing rate and the utilization rate is not essential. However, utilization of the information of the multiplexing rate and the utilization rate facilitates control regarding the degree of multiplexing of the virtual machines of the standby systems SBY, that is, how many virtual CPU cores 12 are to be allocated to the same physical CPU core 11. Also, the multiplexing degree enables a difference in performance between hardware devices with different performance to be absorbed.

In the example of the resource management table TB2 illustrated in FIG. 16, the physical CPU core 11 with a hardware identifier of "#0" and a core number of "0" has been allocated as a dedicated core "for activation", that is, as the activation core 11B. Also, the respective physical CPU cores 11 with a hardware identifier of "#0" and core numbers of "1 to 3" have been allocated as cores in the "occupied state", that is, as the occupied cores 11-X. In addition, the physical CPU core 11 with a hardware identifier of "#0" and a core number of "2", for example, has been allocated to the 0-th virtual CPU core 12 (vCPU0) with a virtual machine identifier of "#01".

Also, the respective physical CPU cores 11 with a hardware identifier of "#1" and a core number of "1" has been allocated as cores in the "shared" state, that is, as the shared cores 11-Y. In addition, the physical CPU core 11 with a hardware identifier of "#1" and a core number of "1" has been allocated to the 0-th virtual CPU core 12 (vCPU0) with a virtual machine identifier of "#02" and to the 0-th virtual CPU core 12 (vCPU0) with a virtual machine identifier of "#04" in a state in which these 0-th virtual CPU cores 12 share the physical CPU core 11, for example.

Also, the physical CPU core 11 with a hardware identifier of "#1" and a core number of "1" has a multiplexing rate of "150%", for example, and thus the physical CPU core 11 has a ratio of performance of 1.5 times the performance of the physical CPU core 11 with a hardware identifier of "0". Also, the physical CPU core 11 with the hardware identifier of "#1" and a core number of "1" has a utilization rate of "20%", for example, and thus the physical CPU core 11 is in a state in which resources of the performance corresponding to the rest 130% can further be allocated to other virtual machines.

Advantages of Service Providing System

In the aforementioned service providing system, it is possible to allocate the physical CPU cores 11, which can be shared by a plurality of virtual machines, to the virtual CPU cores 12 of the respective virtual machines of the virtual network functions 21B to 26B of the standby systems SBY as illustrated in FIG. 1A, for example, in the operating state. Thus, it is possible to reduce the physical resources to be allocated to the virtual machines of the standby systems SBY, which are not ordinarily used, and to increase the resource utilization efficiency of the entire system. Further, the allocation of the physical resources is changed after the respective virtual machines are activated as illustrated in FIGS. 3A and 3B, for example, and thus it is possible to efficiently allocate the respective physical resources in accordance with a change in situation.

Also, it is possible to stabilize performance of the system in a case in which the respective virtual machines are activated using the activation core 11B as illustrated in FIG. 3A, and then the resource allocation to the respective virtual machines of the working systems ACT and the standby systems SBY is changed as illustrated in FIG. 3B, for example. In other words, there is a probability that a significantly large load is imparted when the virtual machines are activated, and there is a probability that operations of other virtual machines that have already operated are affected. However, the physical CPU cores 11 of the other virtual machines that have already operated are not affected by the variation in load by using only the activation core 11B when the virtual machines are activated.

Further, it is possible to further increase the resource utilization efficiency of the entire system in a case in which the respective virtual machines are activated using the shared cores 11-Y as illustrated in FIG. 5A, for example, and then the resource allocations to the respective virtual machines of the working systems ACT and the standby systems SBY is changed as illustrated in FIG. 5B.

Also, it is possible to shorten a time required until the resource allocation is finally completed in a case in which the respective virtual machines are activated using the occupied cores 11-X as illustrated in FIG. 7, and then the resource allocation to the respective virtual machines of the working systems ACT and the standby systems SBY is changed as illustrated in FIG. 5B, for example. For the virtual machines of the virtual network function 20 illustrated in FIG. 7, for example, it is possible to directly start the service without changing the resource allocation and thereby to reduce a delay time associated with a change in resource allocation.

In addition, it is possible to easily ensure performance after the failover by changing the resource allocation such that the shared cores 11-Y allocated to the virtual network function 21B of the standby system SBY is switched to "occupied" when the failover is performed in response to occurrence of the failure 19 illustrated in FIG. 12, for example.

In addition, it is not necessary to change the resource allocation to the virtual machine that has become a new working system ACT through the failover in a case in which the operations illustrated in FIG. 13 are performed to push out the other virtual machines from the shared cores 11-Y when the resource allocation is changed. Thus, it is possible to reduce a delay time associated with a change in resource allocation.

Further, the operations illustrated in FIG. 14 can change the resource allocation with a relatively small amount of processing even if multiple virtual machines have been allocated to the shared cores 11-Y.

Note that the respective functions of the resource allocation system 40 illustrated in FIG. 2 can also be implemented by dedicated hardware or can be implemented as a program that a general-purpose computer for managing the system executes.

REFERENCE SIGNS LIST

10, 10-1 to 10-4 Physical resource (hardware computer resource)
11 Physical CPU core
11B Activation core
11-X Occupied core
11-Y Shared core
12 Virtual CPU core
13 Link
14, 14A, 14B, 14C, 14D, 14E Virtual machine setting file
19 Failure
20, 21, 22, 23, 24, 25, 26 Virtual network function
20B, 21B, 22B, 23B, 24B, 25B, 26B Virtual network function
31, 32, 33, 34 Server
40 Resource allocation system
41 Resource request receiving unit
42 VM management unit (failure case control unit)
42*a* VM information acquisition unit
42*b* Resource operation instruction unit
43 Resource dispensing control unit (initial resource allocation unit, resource allocation change unit)
43*a* Resource management unit
43*b* Resource extraction/selection unit
43*c* Virtual machine control unit
44 Monitoring function unit
44*a* VM Monitoring function unit
44*b* Resource monitoring function unit
45 Storage unit
45*a* Resource information repository
45*b* Virtual machine image repository
50 Resource request unit
100A, 100B Service providing system
TB1 Redundant configuration management table
TB2 Resource management table

The invention claimed is:

1. A service providing system operable to configure an application function by a pair of virtual machines including a first virtual machine and a second virtual machine, to set the first virtual machine in an active state and the second virtual machine, at least initially, in a standby state, and to use the first virtual machine or the second virtual machine in the active state to provide a desired service, the application function being able to provide the desired service, the service providing system comprising:
   a plurality of hardware computer resources capable of being allocated to the first virtual machine and the second virtual machine;
   an initial resource allocation unit, including one or more processors, configured to allocate any of the plurality of hardware computer resources to the first virtual machine and the second virtual machine in accordance with predefined initial conditions when the first virtual machine and the second virtual machine are activated; and
   a resource allocation change unit, including one or more processors, configured to set the any of the plurality of hardware computer resources to be allocated to the first virtual machine in a state of being occupied or executed with priority by the first virtual machine, and set the any of the plurality of hardware computer resources to be allocated to the second virtual machine in a state of being able to be shared by the second virtual machine and other virtual machines, at least before the desired service is started;
   wherein the initial resource allocation unit is configured to select a predefined activation core from among the plurality of hardware computer resources and allocate the activation core to the first virtual machine and the second virtual machine in an initial state, and the resource allocation change unit is configured to change an allocation of the plurality of hardware computer resources to the first virtual machine and the second virtual machine.

2. The service providing system according to claim 1,
   wherein the initial resource allocation unit is configured to select a shared core that is able to be commonly used by a plurality of virtual machines from among the plurality of hardware computer resources and allocate the shared core to the first virtual machine and the second virtual machine in an initial state, and
   the resource allocation change unit is configured to change an allocation of the plurality of hardware computer resources to the first virtual machine and the second virtual machine.

3. The service providing system according to claim 1,
   wherein the initial resource allocation unit is configured to select occupied cores occupied or executed with priority by a single virtual machine from among the plurality of hardware computer resources and allocate the occupied cores to the first virtual machine and the second virtual machine in an initial state, and
   the resource allocation change unit is configured to change an allocation of the plurality of hardware computer resources to the second virtual machine without changing an allocation of the plurality of hardware computer resources to the first virtual machine.

4. The service providing system according to claim 1, further comprising:
   a failure case control unit, including one or more processors, configured to detect an occurrence of a failure in the first virtual machine in the active state, and in a case in which the any of the plurality of the hardware computer resources allocated to the second virtual machine includes a shared core that is able to be shared by a plurality of virtual machines, remove virtual machines other than the second virtual machine from allocation destinations of the shared core.

5. The service providing system according to claim 1, further comprising:
   a failure case control unit, including one or more processors, configured to detect an occurrence of a failure in the first virtual machine in the active state, and in a case in which the any of the plurality of the hardware computer resources allocated to the second virtual machine includes a shared core that is able to be shared by a plurality of virtual machines, secure new occupied cores that are able to be occupied or used with priority from among the plurality of hardware computer resources, and allocate the new occupied cores to the second virtual machine.

6. A resource allocation method for controlling a system operable to configure an application function by a pair of virtual machines including a first virtual machine and a second virtual machine, to set the first virtual machine in an active state and the second virtual machine, at least initially, in a standby state, and to use the first virtual machine or the second virtual machine in the active state to provide a desired service, the application function being able to provide the desired service, the method comprising:
   allocating any of a plurality of hardware computer resources to the first virtual machine and the second virtual machine in accordance with predefined initial conditions when the first virtual machine and the second virtual machine are activated;
   setting the any of the plurality of hardware computer resources to be allocated to the first virtual machine in a state of being occupied or executed with priority by the first virtual machine and setting the any of the plurality of hardware computer resources to be allocated to the second virtual machine in a state of being able to be shared by the second virtual machine and other virtual machines, at least before the desired service is started;
   selecting a shared core that is able to be commonly used by a plurality of virtual machines from among the plurality of hardware computer resources;
   allocating the shared core to the first virtual machine and the second virtual machine in an initial state; and
   based on selecting and allocating the shared core, changing an allocation of the plurality of hardware computer resources to the first virtual machine and the second virtual machine.

7. The resource allocation method according to claim 6 further comprising:
   selecting a predefined activation core from among the plurality of hardware computer resources;
   allocating the activation core to the first virtual machine and the second virtual machine in an initial state; and
   based on selecting and allocating the activation core, changing an allocation of the plurality of hardware computer resources to the first virtual machine and the second virtual machine.

8. The resource allocation method according to claim 6 further comprising:
   selecting occupied cores occupied or executed with priority by a single virtual machine from among the plurality of hardware computer resources;
   allocating the occupied cores to the first virtual machine and the second virtual machine in an initial state; and
   based on selecting and allocating the occupied cores, changing an allocation of the plurality of hardware computer resources to the first virtual machine and the second virtual machine.

9. The resource allocation method according to claim 6 further comprising:
   detecting an occurrence of a failure in the first virtual machine in the active state; and
   in a case in which the any of the plurality of the hardware computer resources allocated to the second virtual machine includes a shared core that is able to be shared by a plurality of virtual machines, removing virtual machines other than the second virtual machine from allocation destinations of the shared core.

10. The resource allocation method according to claim 6 further comprising:
    detecting an occurrence of a failure in the first virtual machine in the active state; and
    in a case in which the any of the plurality of hardware computer resources allocated to the second virtual machine includes a shared core that is able to be shared by a plurality of virtual machines:
       securing new occupied cores that are able to be occupied or used with priority from among the plurality of hardware computer resources; and
       allocating the new occupied cores to the second virtual machine.

11. A non-transitory computer readable medium storing a program that when executed by a computer cause the computer to perform operations of a resource allocation method for controlling a system operable to configure an application function by a pair of virtual machines including a first virtual machine and a second virtual machine, to set the first virtual machine in an active state and the second virtual machine, at least initially, in a standby state, and to use the first virtual machine or the second virtual machine in the active state to provide a desired service, the application function being able to provide the desired service, the operations comprising:
    allocating any of a plurality of hardware computer resources to the first virtual machine and the second virtual machine in accordance with predefined initial conditions when the first virtual machine and the second virtual machine are activated;
    setting the any of the plurality of hardware computer resources to be allocated to the first virtual machine in a state of being occupied or executed with priority by the first virtual machine and setting the any of the plurality of hardware computer resources to be allocated to the second virtual machine in a state of being able to be shared by the second virtual machine and other virtual machines, at least before the desired service is started
    selecting occupied cores occupied or executed with priority by a single virtual machine from among the plurality of hardware computer resources;
    allocating the occupied cores to the first virtual machine and the second virtual machine in an initial state; and based on selecting and allocating the occupied cores, changing an allocation of the plurality of hardware computer resources to the first virtual machine and the second virtual machine.

12. The non-transitory computer readable medium according to claim 11, wherein the operations further comprise:
   selecting a predefined activation core from among the plurality of hardware computer resources;
   allocating the activation core to the first virtual machine and the second virtual machine in an initial state; and
   based on selecting and allocating the activation core, changing an allocation of the plurality of hardware computer resources to the first virtual machine and the second virtual machine.

13. The non-transitory computer readable medium according to claim 11, wherein the operations further comprise:
   selecting a shared core that is able to be commonly used by a plurality of virtual machines from among the plurality of hardware computer resources;
   allocating the shared core to the first virtual machine and the second virtual machine in an initial state; and
   based on selecting and allocating the shared core, changing an allocation of the plurality of hardware computer resources to the first virtual machine and the second virtual machine.

14. The non-transitory computer readable medium according to claim 11, wherein the operations further comprise:
   detecting an occurrence of a failure in the first virtual machine in the active state; and
   in a case in which the any of the plurality of the hardware computer resources allocated to the second virtual machine includes a shared core that is able to be shared by a plurality of virtual machines, removing virtual machines other than the second virtual machine from allocation destinations of the shared core.

15. The non-transitory computer readable medium according to claim 11, wherein the operations further comprise:
   detecting an occurrence of a failure in the first virtual machine in the active state; and
   in a case in which the any of the plurality of the hardware computer resources allocated to the second virtual machine includes a shared core that is able to be shared by a plurality of virtual machines:
      securing new occupied cores that are able to be occupied or used with priority from among the plurality of hardware computer resources; and
   allocating the new occupied cores to the second virtual machine.

* * * * *